(12) United States Patent
Kim et al.

(10) Patent No.: US 10,187,910 B2
(45) Date of Patent: Jan. 22, 2019

(54) METHOD AND APPARATUS FOR RESUMING RRC CONNECTION IN WIRELESS COMMUNICATION SYSTEM

(71) Applicant: LG ELECTRONICS INC., Seoul (KR)

(72) Inventors: Taehun Kim, Seoul (KR); Jaehyun Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 15/592,798

(22) Filed: May 11, 2017

(65) Prior Publication Data

US 2017/0332431 A1 Nov. 16, 2017

Related U.S. Application Data

(60) Provisional application No. 62/335,083, filed on May 12, 2016, provisional application No. 62/414,757, filed on Oct. 30, 2016.

(51) Int. Cl.
| | |
|---|---|
| *H04W 28/16* | (2009.01) |
| *H04W 76/02* | (2009.01) |
| *H04W 72/04* | (2009.01) |
| *H04W 76/19* | (2018.01) |
| *H04W 74/08* | (2009.01) |
| *H04W 76/27* | (2018.01) |

(52) U.S. Cl.
CPC ....... *H04W 76/028* (2013.01); *H04W 72/048* (2013.01); *H04W 76/19* (2018.02); *H04W 28/16* (2013.01); *H04W 74/08* (2013.01); *H04W 76/27* (2018.02)

(58) Field of Classification Search
CPC ... H04W 28/16; H04W 72/048; H04W 74/08; H04W 76/19; H04W 76/27
See application file for complete search history.

(56) References Cited

U.S. PATENT DOCUMENTS

| | | | | |
|---|---|---|---|---|
| 2010/0272004 | A1* | 10/2010 | Maeda | H04L 5/0007 370/312 |
| 2012/0294163 | A1* | 11/2012 | Turtinen | H04W 72/042 370/252 |
| 2013/0058315 | A1* | 3/2013 | Feuersanger | H04W 52/281 370/336 |
| 2014/0018085 | A1* | 1/2014 | Young | H04W 52/0235 455/450 |
| 2015/0049705 | A1* | 2/2015 | Feuersaenger | H04W 72/1215 370/329 |

* cited by examiner

*Primary Examiner* — Sai Aung
(74) *Attorney, Agent, or Firm* — Dentons US LLP

(57) ABSTRACT

A method for resuming an RRC connection performed by a UE in a wireless communication system may include entering an EMM-IDLE mode with a suspend indication as the RRC connection is suspended; generating an initial NAS message when a procedure using the initial NAS message is triggered; requesting a resume of the RRC connection from an upper layer of the UE to a lower layer; and switching from the EMM-IDLE mode with the suspend indication to an EMM-CONNECTED mode when the upper layer receives an indication that the RRC connection is resumed from the lower layer.

15 Claims, 16 Drawing Sheets

[Fig. 2]
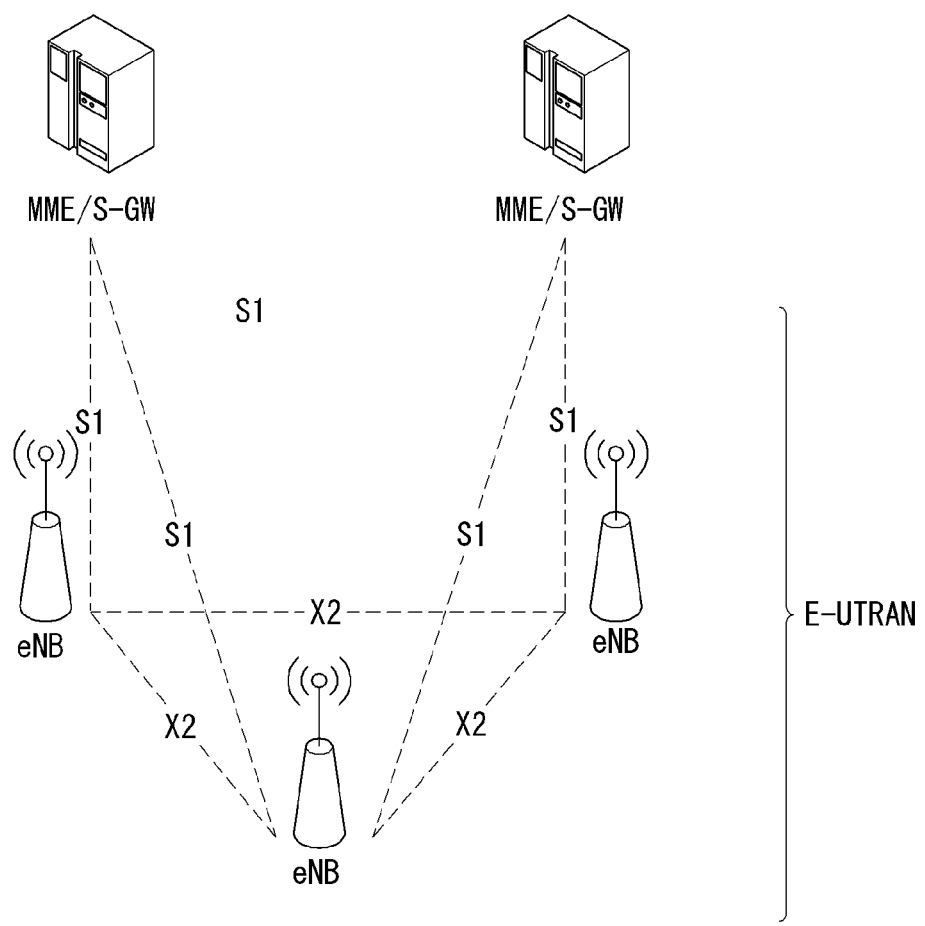

[Fig. 3]
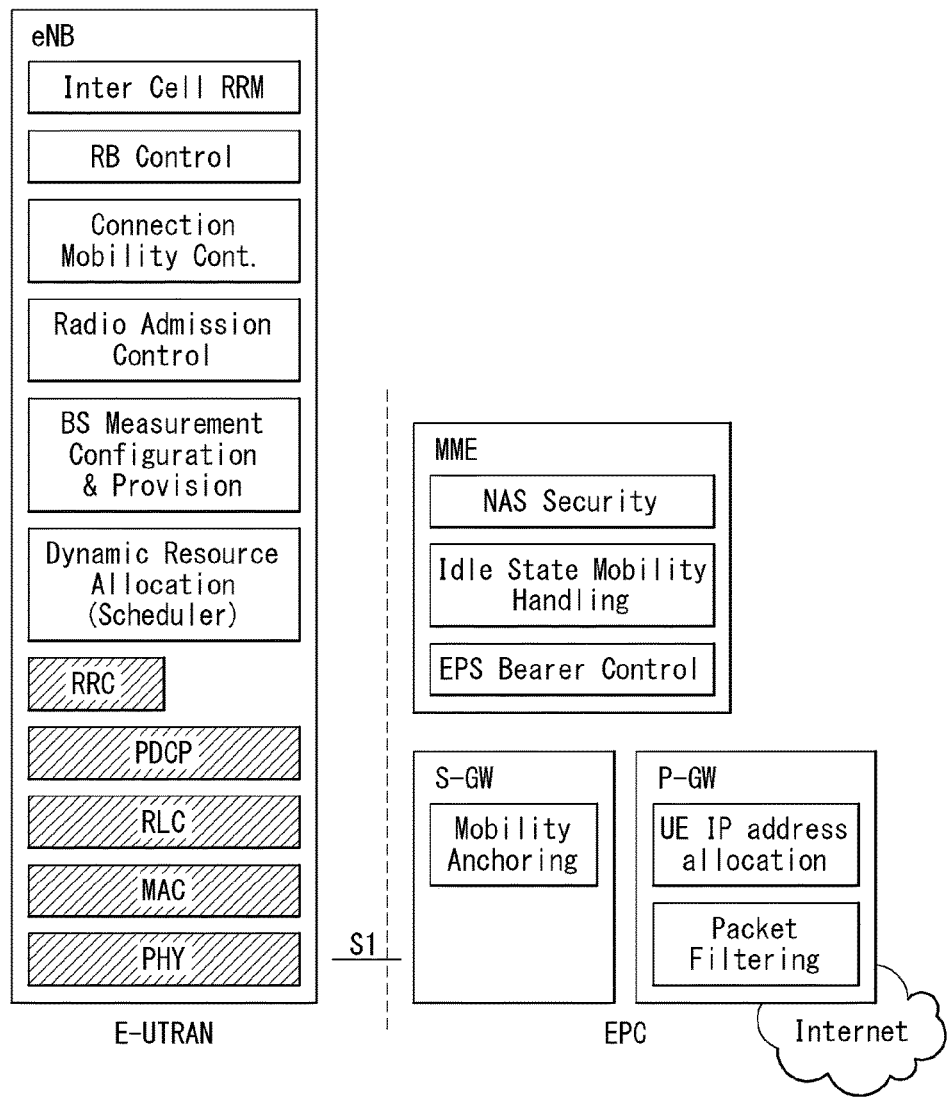

[Fig. 4]
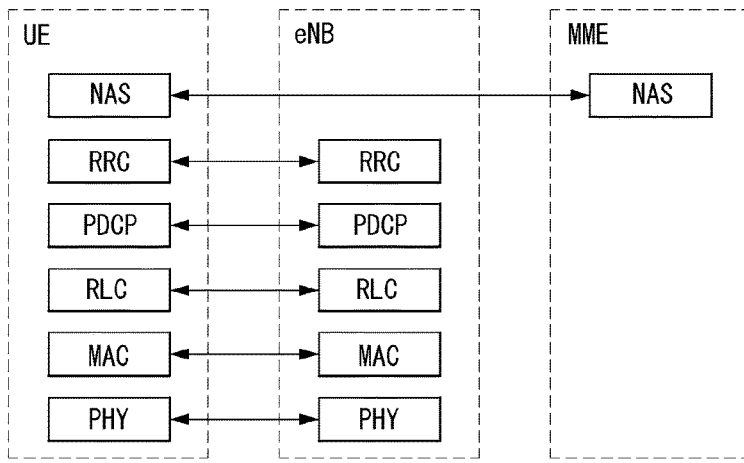
(a) Control Plane Protocol Stack
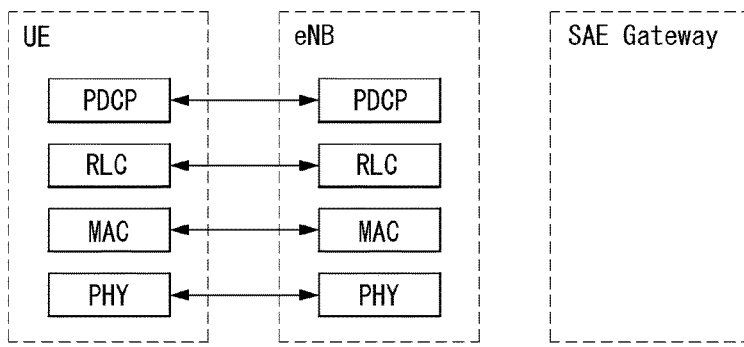
(b) User Plane Protocol Stack
[Fig. 5]
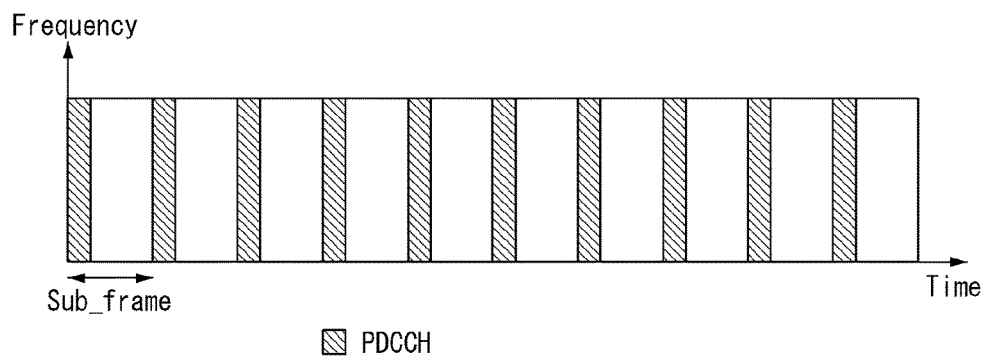

[Fig. 6]
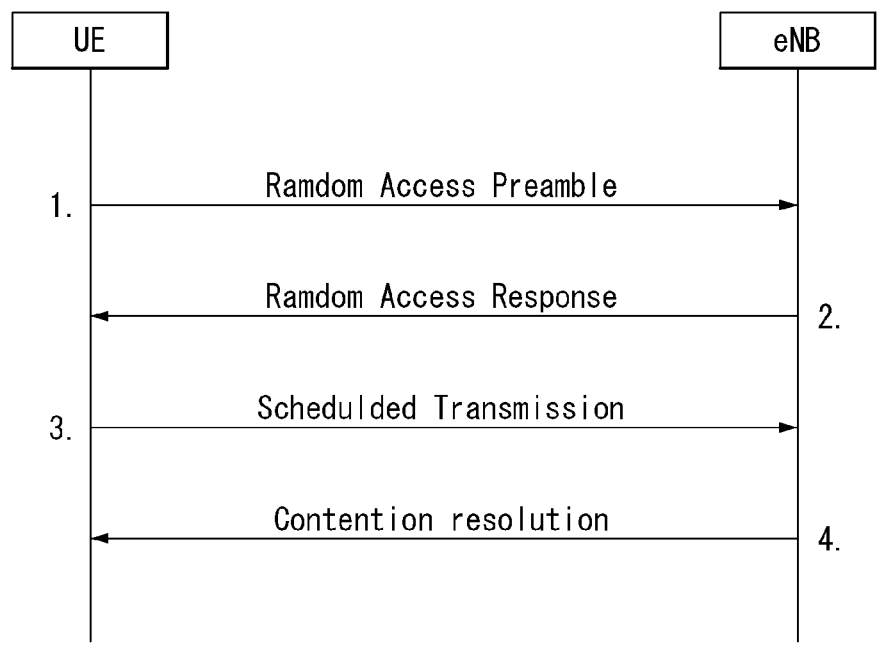

[Fig. 16]
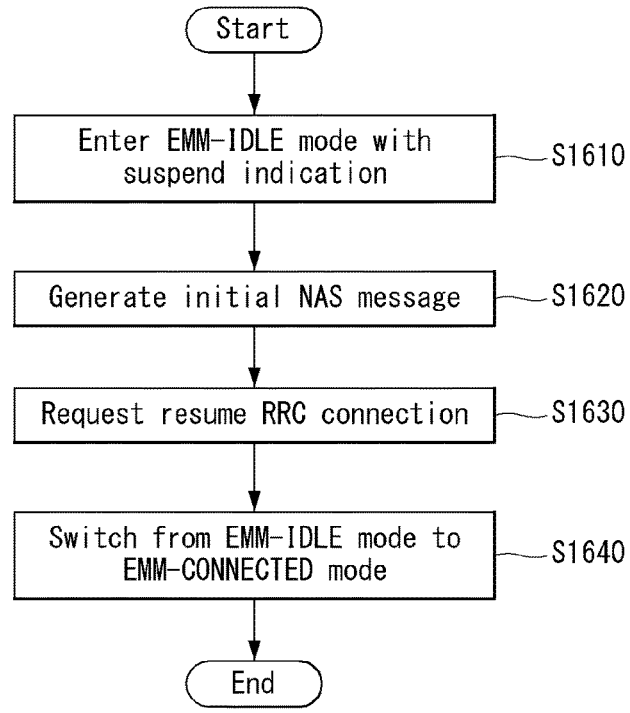
[Fig. 17]
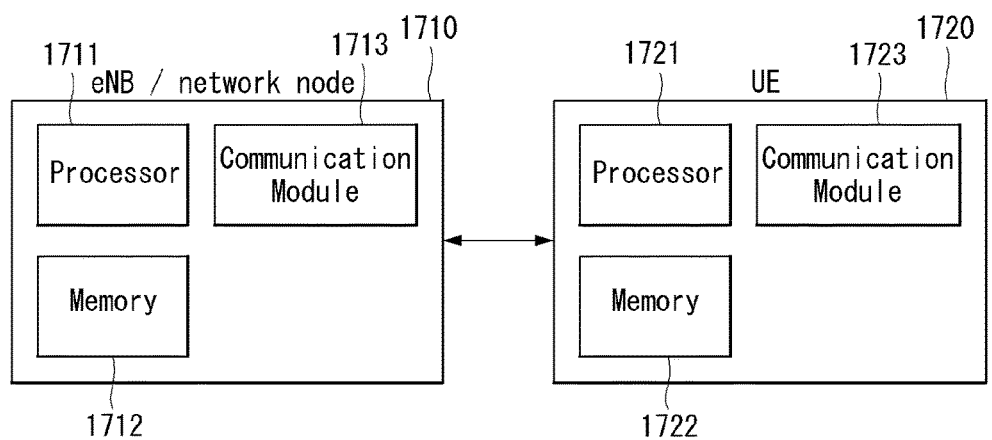

[Fig. 18]
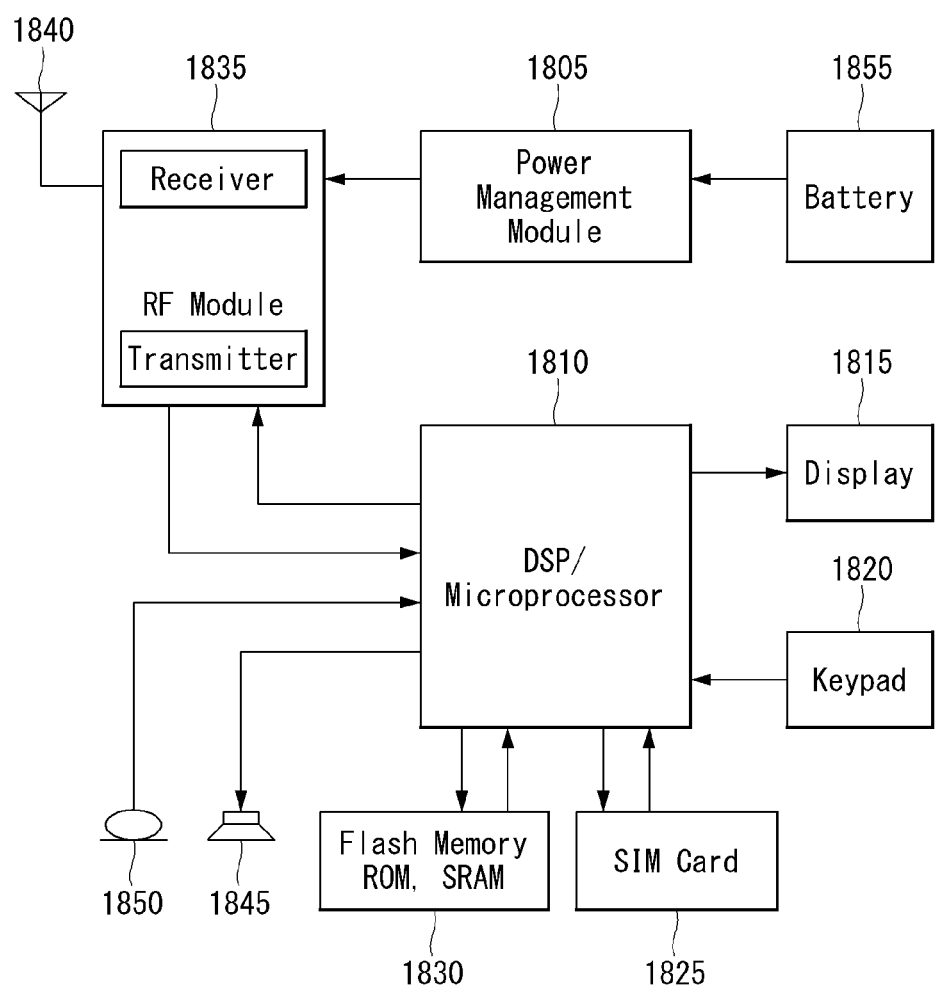

METHOD AND APPARATUS FOR RESUMING RRC CONNECTION IN WIRELESS COMMUNICATION SYSTEM

CROSS-REFERENCE TO RELATED APPLICATIONS

This application claims the benefit of U.S. Provisional Applications No. 62/335,083 filed on May 12, 2016 and No. 62/414,757 filed on Oct. 30, 2016. The contents of this application are hereby incorporated by reference in its entirety.

BACKGROUND OF THE INVENTION

Field of the Invention

The present invention relates to wireless communication systems, and more particularly, to a method for resuming a suspended RRC connection and an apparatus for supporting the same.

Discussion of the Related Art

A mobile communication system has been developed to provide a voice service while guaranteeing user mobility. However, the mobile communication system has been extended to a service range to a data service as well as a voice service, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection devices number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), super wideband support, and device networking have been researched.

SUMMARY OF THE INVENTION

An object of the present invention is to provide a method for resuming a suspended RRC connection efficiently and an apparatus for supporting the same.

Another object of the present invention is to define an operation of UE/eNB/MME clearly in a method for resuming a suspended RRC connection efficiently.

Another object of the present invention is to newly define an accept response with respect to an initial NAS message without an accept response for resuming a suspended RRC connection efficiently.

Another object of the present invention is to define an operation for an MME not to send a reject response with respect to an initial NAS message without an accept response for resuming a suspended RRC connection efficiently.

The technical problems of the present invention are not limited to the above-described technical problems and the other technical problems will be understood by those skilled in the art from the following description.

According to an aspect of the present invention, a method for resuming a radio resource control (RRC) connection performed by a user equipment (UE) in a wireless communication system may include entering an EPS Mobility Management (EMM)-IDLE mode with a suspend indication as the RRC connection is suspended; generating an initial Non-Access Stratum (NAS) message when a procedure using the initial NAS message is triggered; requesting a resume of the RRC connection from an upper layer of the UE to a lower layer; and switching from the EMM-IDLE mode with the suspend indication to an EMM-CONNECTED mode when the upper layer receives an indication that the RRC connection is resumed from the lower layer, when the initial NAS message is a first message type in which an accept response to be transmitted from a Mobility Management Entity (MME) is existed, the initial NAS message may be transmitted to the MME, and when the initial NAS message is a second message type in which an accept response to be transmitted from the MME is not existed, the initial NAS message may not be transmitted to the MME.

In addition, the procedure using the initial NAS message of the second message type may be assumed to be accepted always by the MME.

In addition, the MME may recognize that the procedure using the initial NAS message of the second message type is triggered when the MME does not receive the initial NAS message within a preconfigured time from the time of recognizing that the RRC connection is resumed, and may be a network entity that accept the procedure always.

In addition, the time of recognizing that the RRC connection is resumed by the MME may correspond to a time of receiving an S1-AP UE Context Resume Request message including an Evolved Packet System (EPS) bearer list for which the resume is requested from an evolved-NodeB (eNB).

In addition, the initial NAS message of the first message type may be a TAU (Tracking Area Update) request message, an Attach request message, a Detach request message or an Extended Service Request message generated for CSFB (Circuit Switched Fallback) reason, and the initial NAS message of the second message type may be a Service request message or an Extended Service Request message generated for non-CSFB reason.

In addition, a service type value of the Extended Service Request message generated for the non-CSFB reason may be configured to be a value indicating 'packet services via S1'.

In addition, the method for resuming an RRC connection may further include transmitting uplink data or uplink signaling(e.g. ESM signaling), when the initial NAS message of the second message type is the Service request message and the UE is switched to the EMM-CONNECTED mode.

In addition, the method for resuming an RRC connection may further include maintaining the EMM-IDLE mode with the suspend indication, when the upper layer receives an indication that the RRC connection resume is failed and the RRC connection is suspended from the lower layer.

In addition, the method for resuming an RRC connection may further include switching from the EMM-IDLE mode with the suspend indication to the EMM-IDLE mode without the suspend indication, when the upper layer receives an indication that the RRC connection resume is failed and the RRC connection is not suspended from the lower layer.

In addition, the method for resuming an RRC connection may further include switching from the EMM-IDLE mode with the suspend indication to the EMM-IDLE mode without the suspend indication, transmitting the initial NAS message and proceeding the procedure using the initial NAS message, when upper layer receives an indication that the RRC connection resume is fallbacked.

According to another aspect of the present invention, a user equipment (UE) for resuming a radio resource control (RRC) connection in a wireless communication system may include a communication module configured to transmit and receive a signal; and a processor configured to control the communication module, the processor is configured to: enter an EPS Mobility Management (EMM)-IDLE mode with a suspend indication as the RRC connection is suspended, generate an initial Non-Access Stratum (NAS) message when a procedure using the initial NAS message is triggered, request a resume of the RRC connection from an upper layer of the UE to a lower layer, and switch from the EMM-IDLE mode with the suspend indication to an EMM-CONNECTED mode when the upper layer receives an indication that the RRC connection is resumed from the lower layer, when the initial NAS message is a first message type in which an accept response to be transmitted from a Mobility Management Entity (MME) is existed, the initial NAS message may be transmitted to the MME, and when the initial NAS message is a second message type in which an accept response to be transmitted from the MME is not existed, the initial NAS message may not be transmitted to the MME.

In addition, the procedure using the initial NAS message of the second message type may be assumed to be accepted always by the MME.

In addition, the MME may recognize that the procedure using the initial NAS message of the second message type is triggered when the MME does not receive the initial NAS message within a preconfigured time from a time of recognizing that the RRC connection is resumed and may be a network entity that accept the procedure always.

In addition, the time of identifying that the RRC connection is resumed by the MME may correspond to a time of receiving an S1-AP UE Context Resume Request message including an Evolved Packet System (EPS) bearer list for which the resume is requested from an evolved-NodeB (eNB).

In addition, the initial NAS message of the first message type may be a TAU (Tracking Area Update) request message, an Attach request message, a Detach request message or an Extended Service Request message generated for CSFB (Circuit Switched Fallback) reason, and the initial NAS message of the second message type may be a Service request message or an Extended Service Request message generated for non-CSFB reason.

BRIEF DESCRIPTION OF THE DRAWINGS

For understanding of the present invention, the attached drawings included as a portion of a detailed description provide an exemplary embodiment of the present invention and describe a technical characteristic of the present invention together with a detailed description.

FIG. 2 illustrates an example of a structure of an evolved universal terrestrial radio access network (E-UTRAN) to which the present invention can be applied.

FIG. 3 illustrates a structure of an E-UTRAN and an EPC in a wireless communication system to which the present invention can be applied.

FIG. 4 illustrates a radio interface protocol structure between a UE and an E-UTRAN in a wireless communication system to which the present invention can be applied.

FIG. 5 illustrates a structure of a physical channel in a wireless communication system to which the present invention can be applied.

FIG. 6 illustrates a contention-based random access procedure in a wireless communication system to which the present invention can be applied.

FIG. 16 is a flowchart illustrating an RRC connection resume method of a UE according to an embodiment of the present invention.

FIG. 17 is a block diagram illustrating a configuration of a communication device according to an exemplary embodiment of the present invention.

FIG. 18 is a block diagram illustrating a configuration of a communication device according to an exemplary embodiment of the present invention.

DETAILED DESCRIPTION OF THE INVENTION

Figure 1:
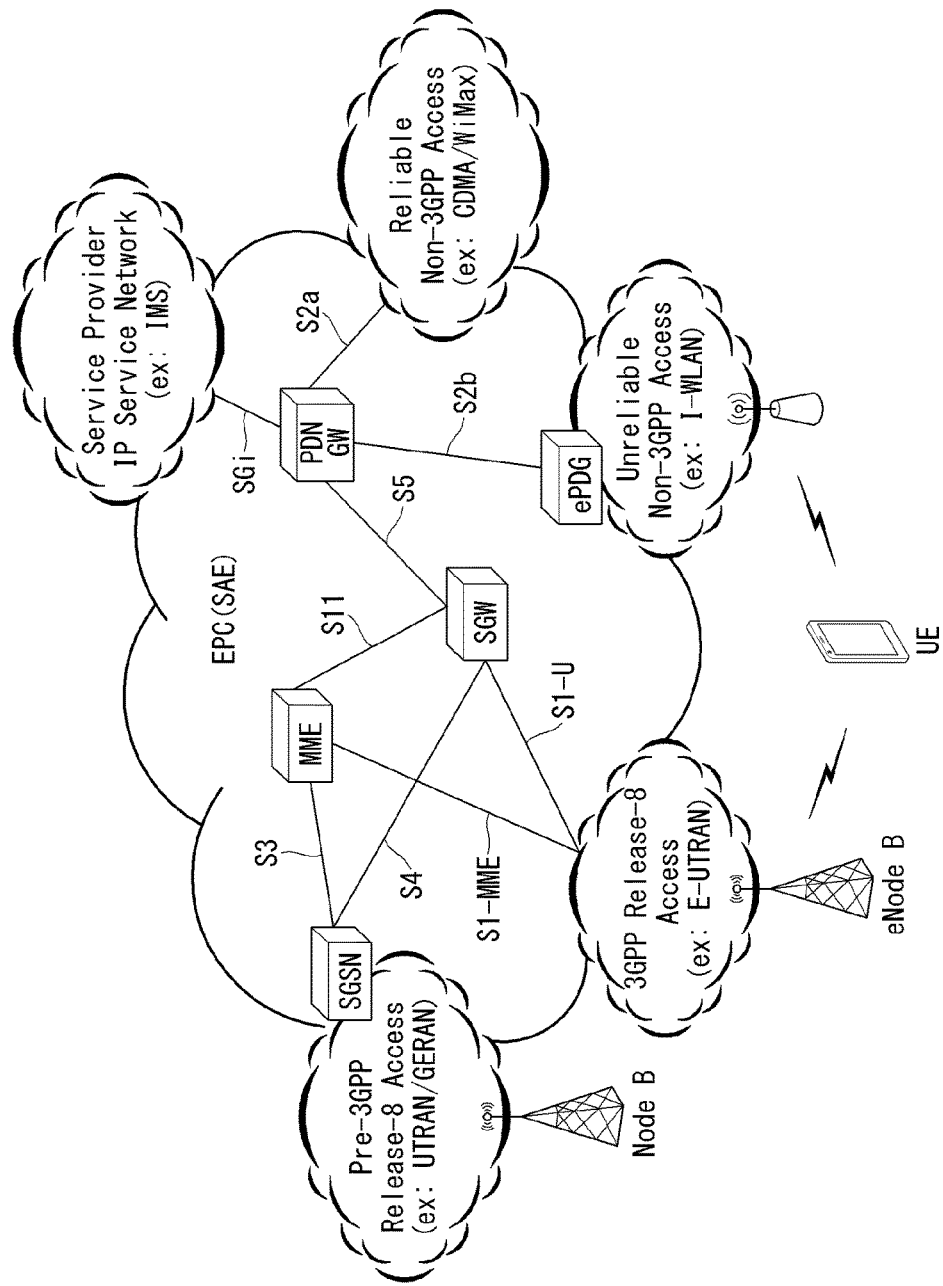
FIG. 1 illustrates an Evolved Packet System (EPS) to which the present invention can be applied.

Hereinafter, an exemplary embodiment of the present invention will be described in detail with reference to the attached drawings. A detailed description of the present invention to be described hereinafter together with the attached drawings describes an exemplary embodiment of the present invention and does not represent a sole embodiment in which the present invention may be executed. The following detailed description includes detailed contents in order to provide complete understanding of the present invention. However, a person of ordinary skill in the art knows that the present invention may be executed without such detailed contents.

In several cases, in order to avoid a concept of the present invention from being ambiguous, well-known structures and devices may be omitted or a core function of each structure and device may be mainly shown in a block diagram form.

In this specification, a base station has a meaning as a terminal node of a network that directly communicates with a terminal. In this document, a specific operation described as performed by a base station may be performed by an upper node of the base station in some case. That is, in a network configured with a plurality of network nodes including the base station, it will become apparent that various operations performed for communication with the terminal may be performed by a base station or other network nodes other than the base station. A Base Station (BS) may be replaced with a term such as a fixed station, a Node B, an evolved-NodeB (eNB), a base transceiver system (BTS), and an Access Point (AP). Further, the 'terminal' may be fixed or may have mobility and may be replaced with a term such as a User Equipment (UE), a Mobile Station (MS), a User terminal (UT), a Mobile Subscriber Station (MSS), a Subscriber Station (SS), an Advanced Mobile Station (AMS), a Wireless terminal (WT), a Machine-Type Communication (MTC) device, a Machine-to-Machine (M2M) device, and a Device-to-Device (D2D) device.

Hereinafter, a downlink (DL) means communication from the BS to the terminal, and an uplink (UL) means communication from the terminal to the base station. In the downlink, a transmitter may be a portion of the base station, and the receiver may be a portion of the terminal. In the uplink, the transmitter may be a portion of the terminal, and the receiver may be a portion of the base station.

Specific terms used in the following description are provided for understanding of the present invention, and use of such a specific term may be changed in other forms without deviating from the spirit and scope of the present invention.

The following technology may be used for various wireless access systems such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). The CDMA may be implemented with radio technology such as universal terrestrial radio access (UTRA) or CDMA2000. The TDMA may be implemented with radio technology such as global system for mobile communications (GSM)/general packet radio service (GPRS)/enhanced data rates for GSM evolution (EDGE). The OFDMA may be implemented with radio technology such as IEEE 802.11 (Wi-Fi), IEEE 802.16 (WiMAX), IEEE 802-20, and E-UTRA (evolved UTRA). The UTRA is a portion of a universal mobile telecommunications system (UMTS). 3rd generation partnership project (3GPP) long term evolution (LTE) is a portion of an evolved UMTS (E-UMTS) using E-UTRA and adapts OFDMA in a downlink and adapts SC-FDMA in an uplink. LTE-advanced (A) is innovation of 3GPP LTE.

Exemplary embodiments of the present invention may be supported by standard documents that describe at least one of IEEE 802, 3GPP, and 3GPP2, which are wireless access systems. That is, in exemplary embodiments of the present invention, steps or portions that are not described to clearly expose the spirit and scope of the present invention may be supported by the documents. Further, entire terms of this document may be described by the standard document.

For clear description, 3GPP LTE/LTE-A is mainly described, but a technical characteristic of the present invention is not limited thereto.

Terms that may be used in this document are defined as follows.

Universal Mobile Telecommunications System (UMTS): 3-Generation mobile communication technology based on Global System for Mobile Communication (GSM) and developed by 3GPP, Evolved Packet System (EPS): A network system configured with an Evolved Packet Core (EPC), which is a packet switched core network based on an Internet Protocol (IP) and an access network such as LTE and UTRAN. The EPS is a network of a form in which the UMTS is innovated.

NodeB: Base station of an UMTS network. The NodeB is installed outdoor and covers a macro cell.

eNodeB: Base station of an EPS network. The eNodeB is installed outdoor and covers a macro cell.

UE: User device. The UE may be referred to as a term such as a terminal, a Mobile Equipment (ME), and a Mobile Station (MS). Further, the UE may be a device that can carry such as a notebook computer, a mobile phone, a Personal Digital Assistant (PDA), a smart phone, and a multimedia device or may be a device that cannot carry such as a Personal Computer (PC) and a vehicle mounting device. In MTC related contents, the UE may indicate an MTC terminal.

IP Multimedia Subsystem (IMS): Subsystem that provides a multimedia service based on IP.

International Mobile Subscriber Identity (IMSI): Internationally uniquely allocated user identifier in a mobile communication network.

Public Land Mobile Network (PLMN): A network configured as an object to provide a mobile communication service to individuals. The PLMN may be divided and configured on an operator basis.

Non-Access Stratum (NAS): A functional layer for transmitting and receiving a traffic message and signaling between a terminal and a core network at UMTS and EPS protocol stacks. The NAS has a main function of supporting mobility of the terminal and supporting a session management procedure that establishes and maintains IP connection between the terminal and a PDN GW.

Hereinafter, the present invention will be described based on the defined terms.

System to which the Present Invention can be Applied

FIG. 1 illustrates an Evolved Packet System (EPS) to which the present invention can be applied.

A network structure diagram of FIG. 1 simply illustrates a structure of an EPS including an Evolved Packet Core (EPC).

An EPC is a core element of System Architecture Evolution (SAE) for enhancing a performance of 3GPP technologies. The SAE corresponds to a research subject that determines a network structure that supports mobility between various kinds of networks. The SAE has a target that provides an optimized packet-based system that supports various wireless access technologies based on, for example, an IP and that provides a more enhanced data transmission ability.

Specifically, the EPC is a core network of an IP mobile communication system for a 3GPP LTE system and may support a packet-based real time and non-real time service. In an existing mobile communication system (i.e., second generation or third generation mobile communication system), a function of a core network was implemented through two distinguished sub-domains of Circuit-Switched (CS) for voice and Packet-Switched (PS) for data. However, in an innovated 3GPP LTE system of the third generation mobile communication system, sub-domains of CS and PS were unified into a single IP domain. That is, in the 3GPP LTE system, connection between terminals having an IP capability may be formed through an IP-based base station (e.g., evolved Node B (eNodeB)), an EPC, an application domain (e.g., IMS). That is, the EPC is an essential structure in implementing an end-to-end IP service.

The EPC may include various constituent elements, and FIG. 1 illustrates a Serving Gateway (SGW) (or S-GW), a Packet Data Network Gateway (PDN GW) (or PGW or P-GW), a Mobility Management Entity (MME), a Serving General Packet Radio Service (GPRS) Supporting Node (SGSN), and an enhanced Packet Data Gateway (ePDG) corresponding to a portion of the various constituent elements.

The SGW operates as a boundary point between a radio access network (RAN) and a core network and is an element that performs a function of maintaining a data path between the eNodeB and the PDN GW. Further, when the terminal moves over an area served by the eNodeB, the SGW performs a function of a local mobility anchor point. That is, for mobility within a Universal Mobile Telecommunications System (Evolved-UMTS) Terrestrial Radio Access Network defined after 3GPP release-8) (E-UTRAN), packets may be routed through the SGW. Further, the SGW may function as an anchor point for mobility with another 3GPP network (RAN defined before 3GPP release-8, for example, UTRAN or Global System for Mobile Communication (GSM)/Enhanced Data rates for Global Evolution (EDGE) Radio Access Network (GERAN)).

The PDN GW corresponds to a termination point of a data interface toward a packet data network. The PDN GW may support policy enforcement features, packet filtering, and charging support. Further, the PDN GW may perform an anchor point function for mobility management with an unreliable network such as a 3GPP network and a non-3GPP network (e.g., an Interworking Wireless Local Area Network (I-WLAN), a Code Division Multiple Access (CDMA) network or a reliable network such as a Wimax).

In an illustration of a network structure of FIG. 1, the SGW and the PDN GW are configured as a separate gateway, but two gateways may be implemented according to a single gateway configuration option.

The MME is an element that performs signaling and control functions for supporting access to network connection of the terminal, allocation of a network resource, tracking, paging, roaming, and handover. The MME controls control plane functions related to a subscriber and session management. The MME manages many eNodeBs and performs signaling for selection of a conventional gateway for handover of another 2G/3G network. Further, the MME performs a function of security procedures, terminal-to-network Session Handling, and idle terminal location management.

The SGSN handles entire packet data such as user mobility management and authentication of another 3GPP network (e.g., GPRS network).

The ePDG functions as a security node of an unreliable non-3GPP network (e.g., I-WLAN, WiFi hotspot).

Referring to FIG. 1, the UE having an IP capability may access to an IP service network (e.g., IMS) in which a provider (i.e., operator) provides via various elements within the EPC based on 3GPP access and non-3GPP access.

Further, FIG. 1 illustrates various reference points (e.g., S1-U, S1-MME). In the 3GPP system, a concept link that connects two functions existing at different functional entities of an E-UTRAN and an EPC is defined to a reference point. Table 1 represents a reference point of FIG. 1. In addition to an illustration of Table 1, various reference points may exist according to a network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
| --- | --- |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to the UE mobility and if the Serving GW needs to connect to a non-collocated PDN GW for the required PDN connectivity. |
| S11 | Reference point of the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among reference points of FIG. 1, S2a and S2b correspond to a non-3GPP interface. S2a is a reference point that provides related control and mobility resource between a reliable non-3GPP access and PDN GW to a user plane. S2b is a reference point that provides related control and mobility support between ePDG and PDN GW to a user plane.

FIG. 2 illustrates an example of a network structure of an evolved universal terrestrial radio access network (E-UTRAN) to which the present invention can be applied.

The E-UTRAN system is an innovated system of an existing UTRAN system and may be, for example, a 3GPP LTE/LTE-A system. The communication network is widely disposed to provide various communication services such as a voice (e.g., Voice over Internet Protocol (VoIP)) through IMS and packet data.

Referring to FIG. 2, the E-UMTS network includes an E-UTRAN, an EPC, and at least one UE. The E-UTRAN is configured with eNBs that provide control plane and user plane protocols to the UE, and the eNBs are connected through an X2 interface.

An X2 user plane interface (X2-U) is defined between the eNBs. The X2-U interface provides non-guaranteed delivery of a user plane packet data unit (PDU). An X2 control plane interface (X2-CP) is defined between two neighboring eNBs. The X2-CP performs a function of context transfer between the eNBs, the control of a user plane tunnel between a source eNB and a target eNB, transfer of a handover related message, and uplink load management.

The eNB is connected to the UE through a wireless interface and is connected to an Evolved Packet Core (EPC) through an S1 interface.

An S1 user plane interface (S1-U) is defined between the eNB and a serving gateway (S-GW). An S1 control plane interface (S1-MME) is defined between the eNB and a mobility management entity (MME). The S1 interface performs an Evolved Packet System (EPS) bearer service management function, a non-access stratum (NAS) signaling transport function, network sharing, and a MME load balancing function. The S1 interface supports many-to-many-relation between the eNB and the MME/S-GW.

The MME may perform various functions of NAS signaling security, Access Stratum (AS) security control, Core Network (CN) Inter-CN signaling for supporting mobility between 3GPP access networks, IDLE mode UE reachability (including execution and control of paging retransmission), Tracking Area Identity (TAI) management (for idle and active mode terminal), PDN GW and SGW selection, MME selection for handover in which the MME is changed, SGSN selection for handover to a 2G or 3G 3GPP access network, roaming, authentication, a bearer management function including dedicated bearer establishment, and Public Warning System (PWS) (including an Earthquake and Tsunami Warning System (ETWS) and Commercial Mobile Alert System (CMAS)) message transmission support.

FIG. 3 illustrates a structure of an E-UTRAN and an EPC in a wireless communication system to which the present invention can be applied.

Referring to FIG. 3, the eNB may perform a function of selection of a gateway (e.g., MME), routing to a gateway for radio resource control (RRC) activation, scheduling and transmission of a broadcast channel (BCH), dynamic resource allocation to the UE in an uplink and a downlink, and mobility control connection in an LTE_ACTIVE state. As described above, a gateway within the EPC may perform a function of origination, LTE_IDLE state management, ciphering of a user plane, a System Architecture Evolution (SAE) bearer control, and ciphering and integrity protection of NAS signaling.

FIG. 4 illustrates a radio interface protocol structure between an UE and an E-UTRAN in a wireless communication system to which the present invention can be applied.

FIG. 4A illustrates a wireless protocol structure of a control plane, and FIG. 4B illustrates a wireless protocol structure of a user plane.

Referring to FIG. 4, layers of a wireless interface protocol between the UE and the E-UTRAN may be divided into a first layer L1, a second layer L2, and a third layer L3 based on subordinate 3 layers of an open system interconnection (OSI) standard model widely known in the art of a communication system. The wireless interface protocol between the UE and the E-UTRAN is horizontally formed with a physical layer, a data link layer, and a network layer and is vertically divided into a protocol stack user plane for transmitting data information and a control plane, which is a protocol stack for transferring signaling.

The control plane is a transmitting path of control messages in which the UE and the network use to manage a call. The user plane means a path that transmits data, for example, voice data or Internet packet data generated in an application layer. Hereinafter, each layer of a control plane and a user plane of a wireless protocol will be described.

By using a physical channel, a physical layer (PHY), which is a first layer L1 provides an information transfer service to a superordinate layer. The physical layer is connected to a medium access control (MAC) layer located at a superordinate level through a transport channel, and data are transmitted between the MAC layer and the physical layer through the transport channel. The transport channels are classified according to a method and feature in which data are transmitted through a wireless interface. Data are transmitted between different physical layers and between a physical layer of a transmitting terminal and a physical layer of a receiving terminal through the physical channel. The physical layer is modulated with an orthogonal frequency division multiplexing (OFDM) method and uses a time and a frequency as a radio resource.

There are several physical control channels used in a physical layer. The physical downlink control channel (PDCCH) notifies the UE of resource allocation of a paging channel (PCH) and a downlink shared channel (DL-SCH) and hybrid automatic repeat request (HARQ) information related to an uplink shared channel (UL-SCH). Further, the PDCCH may transmit UL grant that notifies resource allocation of uplink transmission to the UE. A physical control format indicator channel (PDFICH) notifies the UE of the number of OFDM symbols using for PDCCHs and is transmitted to every subframe. A physical HARQ indicator channel (PHICH) transmits a HARQ acknowledge (ACK)/non-acknowledge (NACK) signal in response to uplink transmission. A physical uplink control channel (PUCCH) transmits uplink control information such as HARQ ACK/NACK, a scheduling request, and a channel quality indicator (CQI) of downlink transmission. The physical uplink shared channel (PUSCH) transmits an UL-SCH.

A MAC layer of the second layer L2 provides a service to a radio link control (RLC) layer, which is a superordinate layer through a logical channel. Further, the MAC layer includes a mapping function between the logical channel and the transport channel and a multiplexing/demultiplexing function to a transport block provided to a physical channel on a transport channel of a MAC service data unit (SDU) that belongs to the logical channel.

An RLC layer of the second layer L2 supports reliable data transmission. A function of the RLC layer includes concatenation, segmentation, and reassembly of an RLC SDU. In order to guarantee various quality of services (QoS) in which a radio bearer (RB) requires, the RLC layer provides three operation modes of a transparent mode (TM), an unacknowledged mode (UM), and an acknowledge mode (AM). An AM RLC provides error correction through an automatic repeat request (ARQ). When the MAC layer performs an RLC function, the RLC layer may be included as a function block of an MAC layer.

A packet data convergence protocol (PDCP) layer of the second layer L2 performs a transfer function of user data in a user plane and a header compression and ciphering function. In order to efficiently transmit an Internet protocol (IP) packet such as Internet protocol version 4 (IPv4) or Internet protocol version 6 (IPv6) through a wireless interface having a small bandwidth, a header compression function means a function of reducing an IP packet header size having a relatively large size and that contains unnecessary control information. A function of a PDCP layer in the control plane includes transfer of control plane data and ciphering/integrity protection.

A radio resource control (RRC) layer located at a lowermost portion of a third layer L3 is defined to only a control plane. The RRC layer performs a function of controlling a radio resource between the UE and the network. For this reason, the UE and the network exchange an RRC message through the RRC layer. The RRC layer controls a logical channel, a transport channel, and a physical channel in relation to a configuration, a re-configuration, and release of radio bearers. For data transmission between the UE and the network, the radio bearer means a logical path provided by the second layer L2. A configuration of a radio bearer means prescription of a feature of a wireless protocol layer and a channel in order to provide a specific service and a configuration of each detailed parameter and operation method. The radio bearer may be again divided into two of signaling RB (SRB) and data RB (DRB). The SRB is used as a path that transmits an RRC message at the control plane, and the DRB is used as a path that transmits user data at the user plane.

A non-access stratum (NAS) layer located as a superordinate layer of the RRC layer performs a function of session management and mobility management.

One cell constituting a base station is set to one of bandwidths such as 1.25, 2.5, 5, 10, and 20 Mhz to provide a downlink or uplink transmission service to several UEs. Different cells may be set to provide different bandwidths.

A downlink transport channel that transmits data from the network to the UE includes a broadcast channel (BCH) that transmits system information, a PCH that transmits a paging message, and a DL-SCH that transmits user traffic or a control message. Traffic or a control message of downlink multicast or a broadcasting service may be transmitted through the DL-SCH or through a separate downlink multicast channel (MCH). An uplink transport channel that transmits data from the UE to the network includes a random access channel (RACH) that transmits an initial control message and an uplink shared channel (UL-SCH) that transmits user traffic or a control message.

The logical channel is a superordinate channel of the transport channel and is mapped to the transport channel. The logical channel may be divided into a control channel for transfer of control area information and a traffic channel for transfer of user area information. The control channel includes a broadcast control channel (BCCH), a paging control channel (PCCH), a common control channel (CCCH), a dedicated control channel (DCCH), and a multicast control channel (MCCH). The traffic channel includes a dedicated traffic channel (DTCH) and a multicast traffic channel (MTCH). The PCCH is a downlink channel that transfers paging information and is used when a network does not know a cell to which the UE belongs. The CCCH is used by the UE that does not have RRC connection to the network. The MCCH is a point-to-multipoint downlink channel used for transferring Multimedia Broadcast and Multicast Service (MBMS) control information from the network to the UE. The DCCH is a point-to-point bi-directional channel used by the UE having RRC connection that transfers dedicated control information between the UE and the network. The DTCH is a point-to-point channel used for only one UE in order to transfer user information that can exist at an uplink and a downlink. The MTCH is a point-to-multipoint downlink channel in order to transfer traffic data from the network to the UE.

In uplink connection between the logical channel and the transport channel, the DCCH may be mapped to the UL-SCH, the DTCH may be mapped to the UL-SCH, and the CCCH may be mapped to the UL-SCH. In downlink connection between the logical channel and the transport channel, the BCCH may be mapped to the BCH or the DL-SCH, the PCCH may be mapped to the PCH, the DCCH may be mapped to the DL-SCH, the DTCH may be mapped to the DL-SCH, the MCCH may be mapped to the MCH, and the MTCH may be mapped to the MCH.

FIG. 5 illustrates a structure of a physical channel in a wireless communication system to which the present invention can be applied.

Referring to FIG. 5, the physical channel transfers signaling and data through a radio resource configured with at least one subcarrier in a frequency domain and at least one symbol in a time domain.

One subframe having a length 1.0 ms is configured with a plurality of symbols. Specific symbol(s) (e.g., a first symbol of the subframe) of the subframe may be used for a PDCCH. The PDCCH transmits information (e.g., resource block) about a dynamically allocated resource and a Modulation and Coding Scheme (MCS).

Random Access Procedure

Hereinafter, a random access procedure providing in an LTE/LTE-A system will be described.

Because the UE does not have RRC Connection to the base station, when the UE performs initial access in an RRC idle state, the random access procedure is performed when performing an RRC connection re-establishment procedure.

In the LTE/LTE-A system, in a process of selecting a random access preamble (RACH preamble), the UE provides both a contention based random access procedure that randomly selects and uses one preamble and a non-contention based random access procedure in which a base station allocates to only a specific UE within a specific set.

FIG. 6 illustrates a contention based random access procedure in a wireless communication system to which the present invention can be applied.

(1) Msg 1 (Message 1)

First, the UE randomly selects one random access preamble (RACH preamble) at a set of random access preambles instructed through system information or a handover command and selects and transmits a physical RACH (PRACH) resource that can transmit the random access preamble.

The base station, having received a random access preamble from the UE decodes the preamble and acquires an RA-RNTI. The RA-RNTI related to the PRACH in which the random access preamble is transmitted is determined according to a time-frequency resource of a random access preamble in which a corresponding UE transmits.

(2) Msg 2 (Message 2)

The base station transmits a random access response addressed with the RA-RNTI acquired through a preamble on a message 1 to the UE. The random access response may include an RA preamble index/identifier, UL grant that notifies an uplink wireless resource, a Temporary Cell RNTI (TC-RNTI), and a time alignment command (TAC). The TAC is information that addresses a time synchronization value in which the base station sends to maintain uplink time alignment to the UE. The UE updates uplink transmission timing using the time synchronization value. When the UE updates time synchronization, the UE starts or restarts a time alignment timer. UL grant includes uplink resource allocation and transmit power command (TPC) used for transmission of a scheduling message (a message 3) to be described later. The TPC is used in determination of transmission power for a scheduled PUSCH.

After the UE transmits a random access preamble, the base station attempts reception of a random access response thereof within a random access response window addressed through system information or handover command, detects a masked PDCCH with the RA-RNTI corresponding to the PRACH, and receives a PDSCH addressed by the detected PDCCH. Random access response information may be transmitted in a form of a MAC packet data unit (MAC PDU), and the MAC PDU may be transferred through the PDSCH.

When the UE successfully receives a random access response having the same random access preamble index/identifier as that of a random access preamble transmitted to the base station, the UE stops monitoring of a random access response. However, until a random access response window is terminated, when the UE does not receive a random access response message or when the UE does not receive an effective random access response having the same random access preamble index as that of a random access preamble transmitted to the base station, it is regarded that reception of the random access response is failed and then the UE may retransmit the preamble.

(3) Msg 3 (Message 3)

When the UE receives an effective random access response, the UE processes each information included in the random access response. That is, the UE applies TAC and stores a TC-RNTI. Further, the UE transmits data stored at a buffer of the UE or newly generated data to the base station using UL grant.

In initial access of the UE, an RRC Connection Request generated in the RRC layer and transferred through the CCCH may be included and transmitted in the message 3, and in an RRC connection re-establishment procedure, an RRC Connection Re-establishment Request generated at the RRC layer and transferred through the CCCH may be included and transmitted in the message 3. Further, the message 3 may include a NAS access request message.

The message 3 should include an identifier of the UE. There are two methods of including an identifier of the UE. In a first method, when the UE already has an effective cell identifier (C-RNTI) allocated from a corresponding cell before the random access procedure, the UE transmits a cell identifier thereof through an uplink transmitting signal corresponding to the UL grant. However, when the UE does not have an effective cell identifier (C-RNTI) allocated from a corresponding cell before the random access procedure, the UE transmits a message 3 including a unique identifier (e.g., S-TMSI or random number) thereof. The unique identifier is generally longer than the C-RNTI.

When the UE transmits data corresponding to the UL grant, the UE starts a contention resolution timer.

(4) Msg 4 (Message 4)

When the base station receives the C-RNTI of a corresponding UE through the message 3 from the UE, the base station transmits a message 4 to the UE using the received C-RNTI. However, when the base station receives the unique identifier (i.e., S-TMSI or random number) from the UE through the message 3, the base station transmits the message 4 to the UE using a TC-RNTI allocated to the corresponding UE in a random access response. For example, the message 4 may include RRC Connection Setup.

The UE transmits data including an identifier thereof through UL grant included in the random access response and awaits an instruction of the base station in order to resolute contention. That is, in order to receive a specific message, the UE attempts reception of a PDCCH. There are two methods of receiving the PDCCH. As described above, in the message 3 transmitted to correspond to the UL grant, when an identifier thereof is a C-RNTI, the UE attempts reception of the PDCCH using the C-RNTI, and when the identifier is an unique identifier (i.e., S-TMSI or random number), the UE attempts reception of the PDCCH using a TC-RNTI included in the random access response. Thereafter, in the former case, before the contention resolution timer is terminated, when the UE receives the PDCCH through the C-RNTI thereof, the UE determines that a random access procedure has been normally performed and terminates the random access procedure. In the latter case, before the contention resolution timer is terminated, when the UE receives the PDCCH through the TC-RNTI, the UE determines data in which a PDSCH addressed by the PDCCH transfers. When a unique identifier thereof is included in the data, the UE determines that a random access procedure has been normally performed and terminates the random access procedure. The UE acquires a C-RNTI through the message 4 and the UE and the network transmit and receive a dedicated message using the C-RNTI.

In an operation in a non-contention based random access process, a random access procedure is terminated with only first message transmission and second message transmission unlike a contention-based random access process of FIG. 6. However, before the UE transmits a random access preamble to the base station with the message 1, the UE receives allocation of the random access preamble from the base station, transmits the allocated random access preamble to the base station with the message 1, and receives a random access response from the base station and thus the random access procedure is terminated.

Suspend and Resume Procedure
1. Definition of EPS Connection Management States
1-1. ECM-IDLE A UE is in ECM-IDLE state when no NAS signalling connection between UE and network exists. In ECM-IDLE state, a UE performs cell selection/reselection according to TS 36.304 and PLMN selection according to TS 23.122.

Except for UEs that have had their RRC connection suspended, there exists no UE context in E-UTRAN for the UE in the ECM-IDLE state. There is no S1_MME and no S1_U connection for the UE in the ECM-IDLE state.

In the EMM(EPS Mobility Management)-REGISTERED and ECM-IDLE state, the UE shall:
  perform a tracking area update if the current TA is not in the list of TAs that the UE has received from the network in order to maintain the registration and enable the MME to page the UE;
  perform the periodic tracking area updating procedure to notify the EPC that the UE is available;
  perform a tracking area update if the RRC connection was released with release cause "load balancing TAU required";
  perform a tracking area update when the UE reselects an E-UTRAN cell and the UE's TIN indicates "P-TMSI";
  perform a tracking area update for a change of the UE's Core Network Capability information or the UE specific DRX parameter;
  perform a tracking area update when a change in conditions in the UE require a change in the extended idle mode DRX parameters previously provided by the MME.
  perform a tracking area update when the UE manually selects a CSG cell, and the CSG ID and associated PLMN of that cell is absent from both the UE's Allowed CSG list and the UE's Operator CSG list;
  answer to paging from the MME by performing a service request procedure or, if the UE has had its RRC connection suspended, the UE initiates the Connection Resume procedure;
  perform the service request procedure in order to establish the radio bearers when uplink user data is to be sent or, if the UE has had its RRC connection suspended the UE initiates the Connection Resume procedure.

The UE and the MME shall enter the ECM-CONNECTED state when the signaling connection is established between the UE and the MME. Initial NAS messages that initiate a transition from ECM-IDLE to ECM-CONNECTED state are Attach Request, Tracking Area Update Request, Service Request or Detach Request. A successful completion of the Connection Resume procedure initiates at UE and MME a state transition from ECM-IDLE to ECM-CONNECTED.

When the UE is in ECM IDLE state, the UE and the network may be unsynchronized, i.e. the UE and the network may have different sets of established EPS bearers. When the UE and the MME enter the ECM CONNECTED state, the set of EPS Bearers is synchronized between the UE and network.

1-2. ECM-CONNECTED

The UE location is known in the MME with an accuracy of a serving eNodeB ID. The mobility of UE is handled by the handover procedure.

The UE performs the tracking area update procedure when the TAI in the EMM system information is not in the list of TA's that the UE registered with the network, or when the UE handovers to an E UTRAN cell and the UE's TIN indicates "P-TMSI".

For a UE in the ECM-CONNECTED state, there exists a signaling connection between the UE and the MME. The signaling connection is made up of two parts: an RRC connection and an S1_MME connection.

The UE shall enter the ECM-IDLE state when its signaling connection to the MME has been released or broken. This release or failure is explicitly indicated by the eNodeB to the UE or detected by the UE.

The S1 release procedure or, if the UE is enabled to use User Plane EPS Optimization the S1 Connection Suspend procedure changes the state at both UE and MME from ECM-CONNECTED to ECM-IDLE.

The UE may not receive the indication for the S1 release, e.g. due to radio link error or out of coverage. In this case, there can be temporal mismatch between the ECM-state in the UE and the ECM-state in the MME.

After a signaling procedure, the MME may decide to release the signaling connection to the UE, after which the state at both the UE and the MME is changed to ECM-IDLE.

There are some abnormal cases where the UE transitions to ECM-IDLE.

When a UE changes to ECM CONNECTED state and if a radio bearer cannot be established, or the UE cannot maintain a bearer in the ECM-CONNECTED state during handovers, the corresponding EPS bearer is deactivated.

1-3. User Plane EPS Optimization

The User Plane EPS Optimization functionality enables support for transfer of user plane data without the need for using the Service Request procedure to establish Access Stratum (AS) context in the serving eNodeB and UE.

As a precondition the UE needs to perform an initial connection establishment that establishes the AS bearers and the AS security context in the network and UE and the RRC connection is suspended by means of a Connection Suspend Procedure. At any subsequent transaction trigger from the NAS layer when UE is in ECM-IDLE, the UE shall attempt the Connection Resume procedure. If the Connection Resume procedure fails, the UE initiates the pending NAS procedure. To maintain support for User Plane EPS Optimization at UE mobility between cells configured on different eNodeBs, the AS Context should be transferred between the eNodeBs.

By using the Connection Suspend procedure:
the UE at transition into ECM-IDLE stores the AS information;
the eNodeB stores the AS information, the S1AP association and the bearer context for that UE;
MME stores the S1AP association and the bearer context for that UE and enters ECM-IDLE;
In the context of this functionality, the UE and the eNodeB store the relevant AS information at transition into ECM-IDLE.

By using the Connection Resume procedure:
the UE resumes the connection with the network using the AS information stored during the Connection Suspend procedure the, potentially new, eNodeB notifies the MME that the connection with the UE has been securely resumed and the MME enters ECM-CONNECTED If a MME has a S1AP association stored for a UE and the MME receives for that UE a EMM procedure over another UE-associated logical S1-connection or at Tracking Area Update procedure with MME change, or SGSN Context Request, when the UE has re-attached, or when the UE has been Detached, the MME and the previously involved eNodeB shall delete that stored S1AP association using the S1 Release procedure.

Service Request Procedures

1. Network Triggered Service Request

Figure 7:
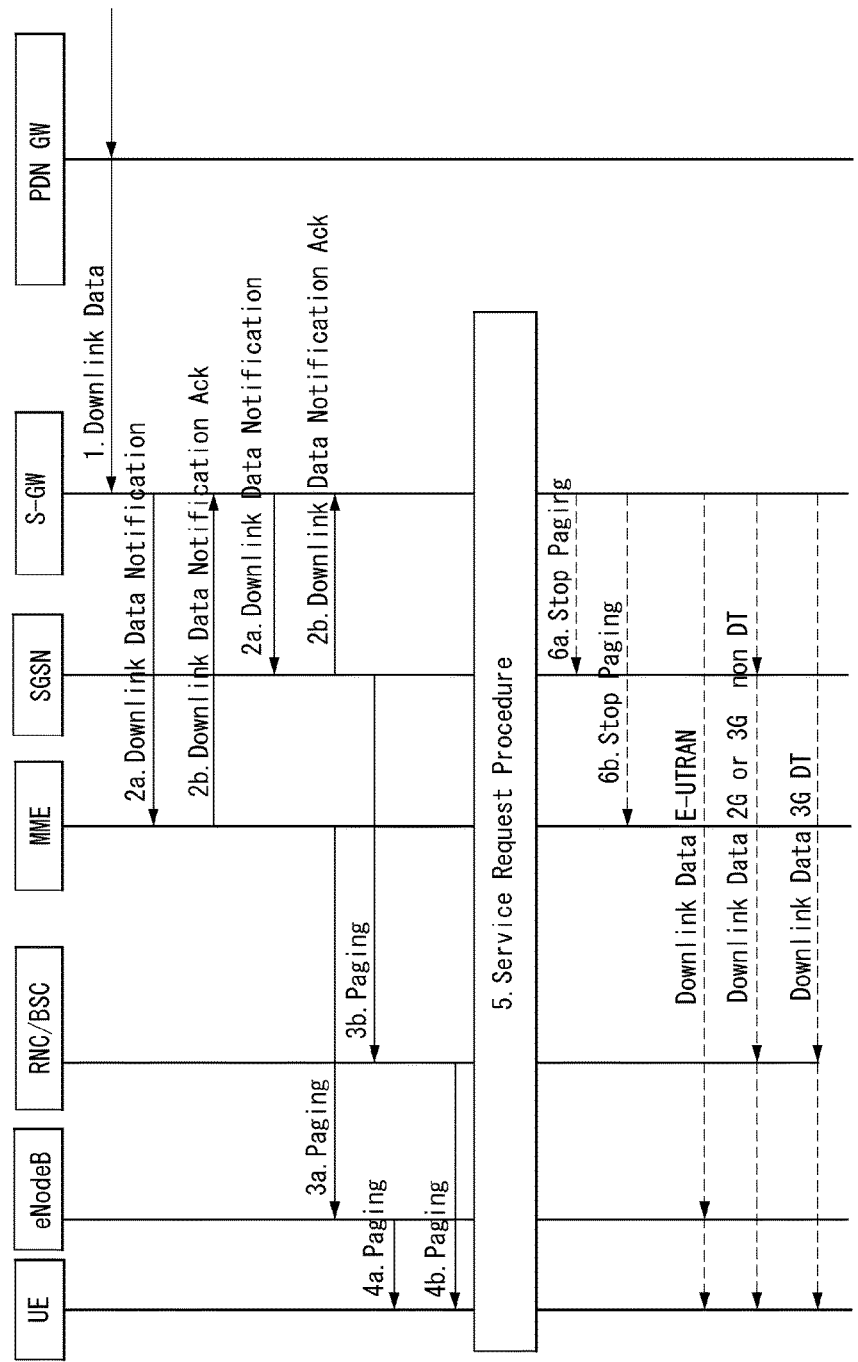
FIG. 7 illustrates a network triggered service request procedure.

FIG. 7 illustrates a network triggered service request procedure.

If the MME needs to signal with the UE that is in ECM-IDLE state, e.g. to perform the MME/HSS-initiated detach procedure for the ECM-IDLE mode UE or the S GW receives control signaling (e.g. Create Bearer Request or Update Bearer Request), the MME starts network triggered service request procedure from step 3a in the Network Triggered Service request procedure.

If ISR is activated, when the Serving GW receives a Create Bearer Request or Update Bearer Request for a UE, and the S GW does not have a downlink S1-U and the SGSN has notified the Serving GW that the UE has moved to PMM-IDLE or STANDBY state, the Serving GW buffers signaling messages and sends a Downlink Data Notification to trigger the MME and SGSN to page the UE. If the Serving GW, while waiting for the user plane to be established, is triggered to send a second Downlink Data Notification with higher priority (i.e. ARP(Allocation and Retention Priority) priority level) than the first Downlink Data Notification was sent with, the Serving GW sends a new Downlink Data Notification message indicating the higher priority to the MME. If the Serving GW receives additional downlink signaling messages for a bearer with same or lower priority than the first Downlink Data Notification was sent for or if the Serving GW has sent the second Downlink Data Notification message indicating the higher priority and receives additional downlink signaling messages for this UE, the Serving GW buffers these downlink signaling messages and does not send a new Downlink Data Notification. The S GW will be notified about the current RAT type based on the UE triggered service request procedure. The S GW will go on executing the dedicated bearer activation or dedicated bearer modification procedure, i.e. send the corresponding buffered signaling to MME or SGSN which UE resides in now and inform the current RAT type to the PDN GW if the RAT type has been changed compared to the last reported RAT Type. If dynamic PCC is deployed, the current RAT type information shall also be conveyed from the PDN GW to the PCRF. If the PCRF response leads to an EPS bearer modification the PDN GW should initiate a bearer update procedure.

When the Serving GW sends a Downlink Data Notification, it shall include both EPS Bearer ID and ARP. If the Downlink Data Notification is triggered by the arrival of downlink data packets at the Serving GW, the Serving GW shall include the EPS Bearer ID and ARP associated with the bearer on which the downlink data packet was received. If the Downlink Data Notification is triggered by the arrival of control signaling, the Serving GW shall include the EPS Bearer ID and ARP if present in the control signaling. If the ARP is not present in the control signaling, the Serving GW shall include the ARP in the stored EPS bearer context.

If a LIPA PDN connection exists, when the L-GW receives the downlink data for a UE that is in ECM-IDLE state, the L-GW sends the first downlink user packet to Serving GW and buffers all other downlink user packets. The Serving GW will trigger the MME to page the UE.

1. When the Serving GW receives a downlink data packet/control signaling for a UE known as not user plane connected (i.e. the S GW context data indicates no downlink user plane TEID), it buffers the downlink data packet and identifies which MME or SGSN is serving that UE.

If that MME has requested the Serving GW to throttle downlink low priority traffic and if the downlink data packet is received on a low priority bearer to be throttled, the SGW drops the downlink data. The steps below are not executed.

If that MME has requested the S GW to delay sending the Downlink Data Notification, the Serving GW buffers the downlink data and waits until the timer expires before continuing with step 2. If the DL-TEID and eNodeB address for that UE is received before the expiry of the timer, the timer shall be cancelled and the Network triggered Service Request procedure is finished without executing the steps below, i.e. DL data are sent to the UE.

If the Serving GW receives additional downlink data packets/control signaling for this UE before the expiry of the timer, the Serving GW does not restart this timer.

2. The Serving GW sends a Downlink Data Notification message (ARP, EPS Bearer ID, Paging Policy Indication) to the MME and SGSN nodes for which it has control plane connectivity for the given UE. The ARP and EPS Bearer ID are always set in Downlink Data Notification. The MME and SGSN respond to the S GW with a Downlink Data Notification Ack message. When supporting Paging Policy Differentiation, the Serving GW indicates in the message the Paging Policy Indication related to the downlink data that triggered the Downlink Data Notification message.

The ARP, the EPS Bearer ID and optionally the Paging Policy Indication are sent to the SGSN as well as MME.

An MME and an SGSN that detects that the UE is in a power saving state (e.g. Power Saving Mode) and cannot be reached by paging at the moment, shall invoke extended buffering depending on operator configuration, except for cases described in next paragraphs. MME/SGSN derives the expected time before radio bearers can be established to the UE. The MME/SGSN then indicates DL Buffering Requested to the Serving GW in the Downlink Data Notification Ack message and includes a DL Buffering Duration time and optionally a DL Buffering Suggested Packet Count. The MME/SGSN stores a new value for the DL Data Buffer Expiration Time in the MM context for the UE based on the DL Buffering Duration time and skips the remaining steps of this procedure. The DL Data Buffer Expiration Time is used for UEs using power saving state and indicates that there are buffered data in the Serving GW and that the user plane setup procedure is needed when the UE makes signaling with the network. When the DL Data Buffer Expiration Time has expired, the MME/SGSN considers no DL data to be buffered and no indications of Buffered DL Data Waiting are sent during context transfers at TAU procedures.

If there is a "Availability after DDN Failure" monitoring event configured for the UE in the MME/SGSN, the MME/SGSN does not invoke extended buffering. Instead, the MME/SGSN sets the Notify-on-available-after-DDN-failure flag to remember to send an "Availability after DDN Failure" notification when the UE becomes available. If there is a "UE Reachability" monitoring event configured for the UE in the MME/SGSN, the MME/SGSN does not invoke extended buffering.

When "Availability after DDN failure" and "UE reachability" monitoring events are used for a UE, the application server is assumed to send data when the UE is reachable, hence no extended buffering is needed. If there are multiple application servers, the event notifications and extended buffering may be needed simultaneously. It is assumed this is handled through additional information based on SLA as described in the next paragraph.

The MME/SGSN may use additional information based on a SLA with the MTC user for when to invoke extended buffering, e.g. only invoke it for a certain APN, do not invoke it for certain subscribers, invoke extended buffering in conjunction with "Availability after DDN failure" and "UE reachability" monitoring events, etc.

A Serving GW that receives a DL Buffering Requested indication in a Downlink Data Notification Ack message stores a new value for the DL Data Buffer Expiration Time based on the DL Buffering Duration time and does not send any additional Downlink Data Notification if subsequent downlink data packets are received in the Serving GW before the buffer time DL Data Buffer Expiration Time has expired for the UE.

If the Serving GW, while waiting for the user plane to be established, is triggered to send a second Downlink Data Notification for a bearer with higher priority (i.e. ARP priority level) than the first Downlink Data Notification was sent for, the SGW sends a new Downlink Data Notification message indicating the higher priority to the MME. If the Serving GW receives additional downlink data packets for a bearer with same or lower priority than the first Downlink Data Notification was sent for or if the Serving GW has sent the second Downlink Data Notification message indicating the higher priority and receives additional downlink data packets for this UE, the Serving GW buffers these downlink data packets and does not send a new Downlink Data Notification.

If the Serving GW, while waiting for the user plane to be established, receives a Modify Bearer Request message from MME or SGSN other than the one it sent a Downlink Data Notification message to, the Serving GW re-sends the Downlink Data Notification message only to the new MME or SGSN from which it received the Modify Bearer Request message even if ISR is active.

If the Tracking Area Update procedure with MME change or the Routing Area Update procedure is in progress when the old MME receives a Downlink Data Notification message, the old MME may reject a Downlink Data Notification message with an indication that the Downlink Data Notification message has been temporarily rejected.

Similarly, if the Routing Area Update procedure with SGSN change or the Tracking Area Update procedure is in progress when the old SGSN receives a Downlink Data Notification message, the old SGSN may reject a Downlink Data Notification message with an indication that the Downlink Data Notification message has been temporarily rejected.

Upon reception of a Downlink Data Notification Ack message with an indication that the Downlink Data Notification message has been temporarily rejected and if the Downlink Data Notification is triggered by the arrival of downlink data packets at the Serving GW, the Serving GW may start a locally configured guard timer and buffers all downlink user packets received to the given UE and waits for a Modify Bearer Request message to come. Upon reception of a Modify Bearer Request message, the Serving GW re-sends the Downlink Data Notification message only to the new MME or SGSN from which it received the Modify Bearer Request message even if ISR is active. Otherwise the Serving GW releases buffered downlink user packets at expiry of the guard timer or receiving the Delete Session Request message from MME/SGSN.

Upon reception of a Downlink Data Notification Ack message with an indication that the Downlink Data Notification message has been temporarily rejected and if the Downlink Data Notification is triggered by the arrival of signaling messages at the Serving GW, the Serving GW may reject the PDN GW initiated EPS bearer(s) request with the same indication that the request has been temporarily rejected. Upon reception of a rejection for an EPS bearer(s) PDN GW initiated procedure with an indication that the request has been temporarily rejected, the PDN GW may start a locally configured guard timer. The PDN GW may re-attempt, up to a pre-configured number of times, when either it detects the UE accesses via a new SGW or at expiry of the guard timer.

3a. If the UE is registered in the MME and considered reachable for paging, the MME sends a Paging message (NAS ID for paging, TAI(s), UE identity based DRX index, Paging DRX length, list of CSG IDs for paging, Paging Priority indication) to each eNodeB belonging to the tracking area(s) in which the UE is registered. Steps 3-4 are omitted if the MME already has a signaling connection over S1-MME towards the UE but the S1-U tunnel has not yet been established.

If extended idle mode DRX is enabled for the UE, the MME pages the UE just before the occurrence of the UE's next paging occasion.

Steps 3a and 4a are performed also when the UE and the network support User Plane EPS Optimization and the previous RRC connection has been suspended.

Paging priority indication is included only:
  if the MME receives a Downlink Data Notification or Create Bearer Request with an ARP priority level associated with MPS or other priority services, as configured by the operator.
  One Paging Priority level can be used for multiple ARP priority level values. The mapping of ARP priority level values to Paging Priority level (or levels) is configured by operator policy.

During a congestion situation the eNodeB may prioritize the paging of UEs according to the Paging Priority indications.

If the MME, while waiting for a UE response to the Paging Request message sent without Paging Priority indication, receives an Update Bearer Request, Create Bearer Request or Downlink Data Notification, any of which indicates an ARP priority level associated with MPS or other priority services, as configured by the operator, the MME shall send another paging message with the suitable Paging Priority.

When the MME is configured to support CSG paging optimization in the CN, the MME should avoid sending Paging messages to those eNodeB(s) with CSG cells for which the UE does not have a CSG subscription. When the MME is configured to support CSG paging optimization in the HeNB Subsystem, the list of CSG IDs for paging is included in the Paging message. For CSG paging optimization, the CSG IDs of expired CSG subscriptions and valid CSG subscriptions are both included in the list. If the UE has emergency bearer service the MME shall not perform the CSG paging optimization.

An expired CSG subscription indicates that the UE is not allowed service in the CSG. However, since the removal of the CSG from the UE is pending, it is possible the UE will camp on that CSG and therefore the UE is still paged for the CSG.

The eNodeB reports to the MME the CSG ID supported. When the MME supports SIPTO(Selected IP Traffic Offload) at Local Network and LIPA paging for traffic arriving on the PDN connection with L-GW function collocated with the (H)eNB the MME should only page this (H)eNB to avoid sending Paging messages to eNodeB(s) that are not handling this specific PDN connection.

Paging strategies may be configured in the MME for different combinations of APN, Paging Policy Indication from SGW when available and other EPS bearer context information e.g. QCI. APN and any EPS bearer context information are identified by EPS bearer ID received in Downlink Data Notification. Paging strategies may include:
  paging retransmission scheme (e.g. how frequently the paging is repeated or with what time interval);
  determining whether to send the Paging message to the eNodeBs during certain MME high load conditions;
  whether to apply sub-area based paging (e.g. first page in the last known ECGI or TA and retransmission in all registered TAs).

If extended idle mode DRX was enabled in the UE, the MME may additionally take into account the Paging Time Window length for paging retransmission schemes.

The Paging priority in the Paging message is set based on priority level of the ARP IE received in Downlink Data Notification or Create/Update Bearer Request message and is independent from any paging strategy.

The MME and the E-UTRAN may support further paging optimizations in order to reduce the signaling load and the network resources used to successfully page a UE by one or several following means:
  by the MME implementing specific paging strategies (e.g. the S1 Paging message is sent to the eNB that served the UE last);
  by the MME considering Information On Recommended Cells And ENBs provided by the E-UTRAN at transition to ECM IDLE. The MME takes the eNB related part of this information into account to determine the eNBs to be paged, and provides the information on recommended cells within the S1 Paging message to each of these eNBs;
  by the E-UTRAN considering the Paging Attempt Count Information provided by the MME at paging.

When implementing such optimizations/strategies, the MME shall take into account any PSM active timer and the DRX interval for the UE.

If the UE Radio Capability for Paging Information is available in the MME, the MME adds the UE Radio Capability for Paging Information in the S1 Paging message to the eNB.

If the Information On Recommended Cells And ENBs For Paging is available in the MME, the MME shall take that information into account to determine the eNBs for paging and, when paging an eNB, the MME may transparently convey the information on recommended cells to the eNB.

The MME may include in the S1AP Paging message(s) the paging attempt count information. The paging attempt count information shall be the same for all eNBs selected by the MME for paging.

If the MME has Information for Enhanced Coverage stored, the MME shall include it in the Paging message for all eNBs.

3b. If the UE is registered in the SGSN, the SGSN sends paging messages to RNC/BSS.

4a. If eNodeBs receive paging messages from the MME, the UE is paged by the eNodeBs.

4b. If RNC/BSS nodes receive paging messages from the SGSN the UE is paged by the RNSC/BSS.

5. When UE is in the ECM-IDLE state, upon reception of paging indication in E-UTRAN access, the UE initiates the UE triggered Service Request procedure or, if the UE is enabled to use User Plane EPS Optimization and there is suspended access stratum context stored in the UE, the UE initiates the Connection Resume procedure. If the MME already has a signaling connection over S1-MME towards the UE but the S1-U tunnel has not yet been established, then the messages sequence performed start from the step when MME establishes the bearer(s).

Upon reception of paging indication in UTRAN or GERAN access, the MS shall respond in respective access and the SGSN shall notify the S GW.

The MME and/or SGSN supervises the paging procedure with a timer. If the MME and/or SGSN receives no response from the UE to the Paging Request message, it may repeat the paging according to any applicable paging strategy described in step 2.

If the MME and/or SGSN receives no response from the UE after this paging repetition procedure, it shall use the Downlink Data Notification Reject message to notify the Serving GW about the paging failure, if paging was triggered by a Downlink Data Notification message, unless the MME or SGSN is aware of an ongoing MM procedure that prevents the UE from responding, i.e. the MME or SGSN received a Context Request message indicating that the UE performs TAU or RAU procedure with another MME or SGSN. If paging was triggered by control signaling from the Serving GW and if the MME or SGSN receives no response from the UE after this paging repetition procedure, the MME or SGSN shall reject that control signaling. When a Downlink Data Notification Reject message is received, if ISR is not activated, the Serving GW deletes the buffered packet(s). If ISR is activated and the Serving GW receives Downlink Data Notification Reject message from both SGSN and MME, the Serving GW deletes the buffered packet(s) or rejects the control signaling which triggers the Service Request procedure. The Serving GW may invoke the procedure PGW Pause of Charging if UE is in ECM IDLE and the PDN GW has enabled "PDN charging pause" feature.

The Serving GW may initiate the procedure PGW Pause of Charging at any time before step 5 if the UE is in ECM IDLE and the PDN GW has indicated that the feature is enabled for this PDN.

6a. If ISR is activated and paging response is received in E UTRAN access the Serving GW sends a "Stop Paging" message to the SGSN.

6b. If ISR is activated and paging response is received in UTRAN or GERAN access the Serving GW sends a "Stop Paging" message to the MME.

The Serving GW transmits downlink data towards the UE via the RAT which performed the Service Request procedure.

For a LIPA PDN connection, after the UE enters connected mode, the packets buffered in the L-GW are forwarded to the HeNB on the direct path. If the UE enters connected mode at a different cell than the one where the L-GW is co-located, the MME shall deactivate the LIPA PDN connection.

If the network triggered service request fails due to no response from the UE, then MME and/or SGSN may based on operator policy initiate the Dedicated Bearer Deactivation procedure for preserved GBR bearers.

Connection Suspend Procedure

Figure 8:
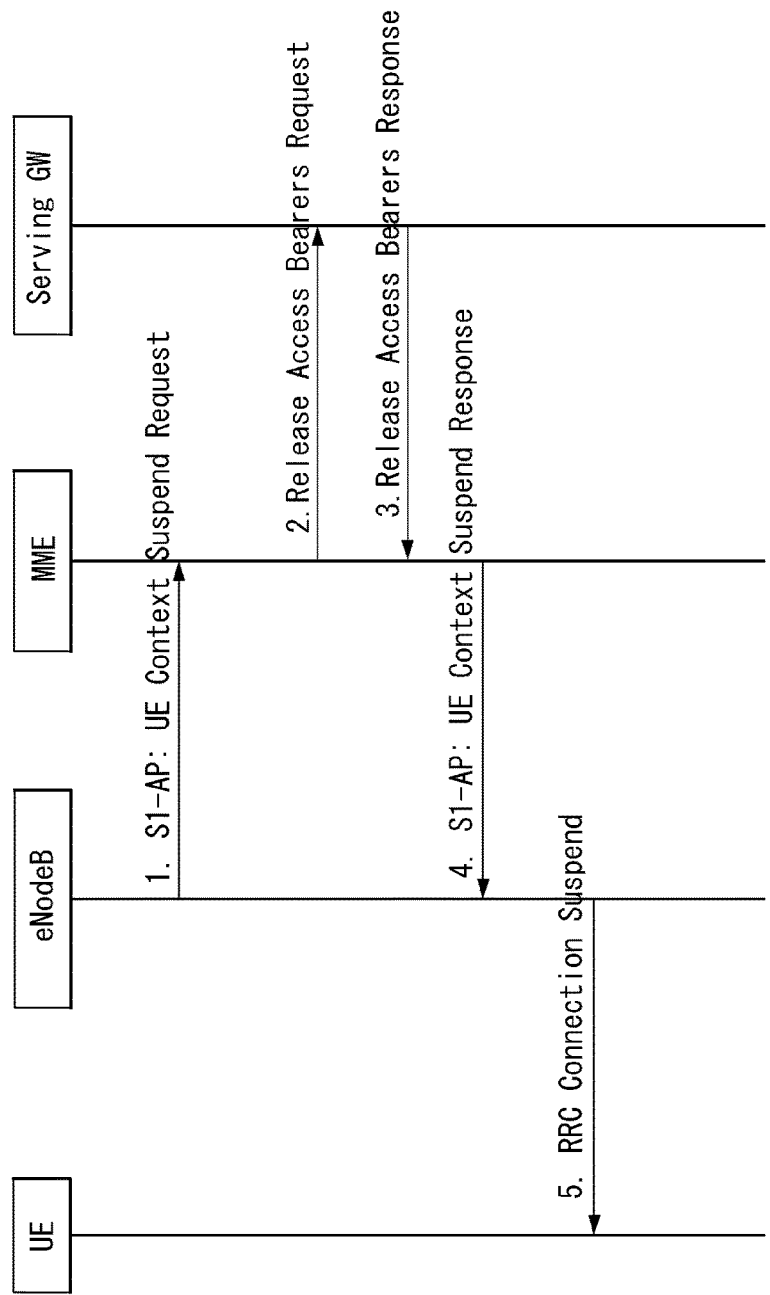
FIG. 8 illustrates a connection suspend procedure initiated by eNodeB.

FIG. 8 illustrates a connection suspend procedure initiated by eNodeB.

This procedure is used by the network to suspend the connection if the UE and the network support User Plane EPS Optimization.

The eNodeB initiates the Connection Suspend procedure to the MME. The eNodeB indicates to the MME that the UE's RRC connection is to be suspended upon which MME enters ECM-IDLE. Data related to the S1AP association, UE Context and bearer context, necessary to resume the connection is kept in the eNB, UE and the MME.

The eNodeB may include the Information On Recommended Cells And eNBs For Paging in the S1 UE Context Suspend Request message. If available, the MME shall store this information to be used when paging the UE.

The eNB includes Information for Enhanced Coverage, if available, in the S1 UE Context Suspend Request message.

2. The MME sends a Release Access Bearers Request message to the Serving GW that requests the release of all S1-U bearers for the UE.

3. The Serving GW releases all eNodeB related information (address and downlink TEIDs) for the UE and responds with a Release Access Bearers Response message to the MME. Other elements of the UE's Serving GW context are not affected. If downlink packets arrive for the UE, the Serving GW starts buffering downlink packets received for the UE and initiating the "Network Triggered Service Request" procedure.

Based on operator policy any received Indication of "Abnormal Release of Radio Link" may be used by Serving GW in subsequent decisions to trigger PDN charging pause if the feature has been enabled on that PDN.

4. Serving GW informs the MME in the Release Access Bearer Response message about release of S1-U bearers.

5. The eNodeB sends RRC message to suspend the RRC Connection towards the UE.

Connection Resume Procedure

Figure 9:
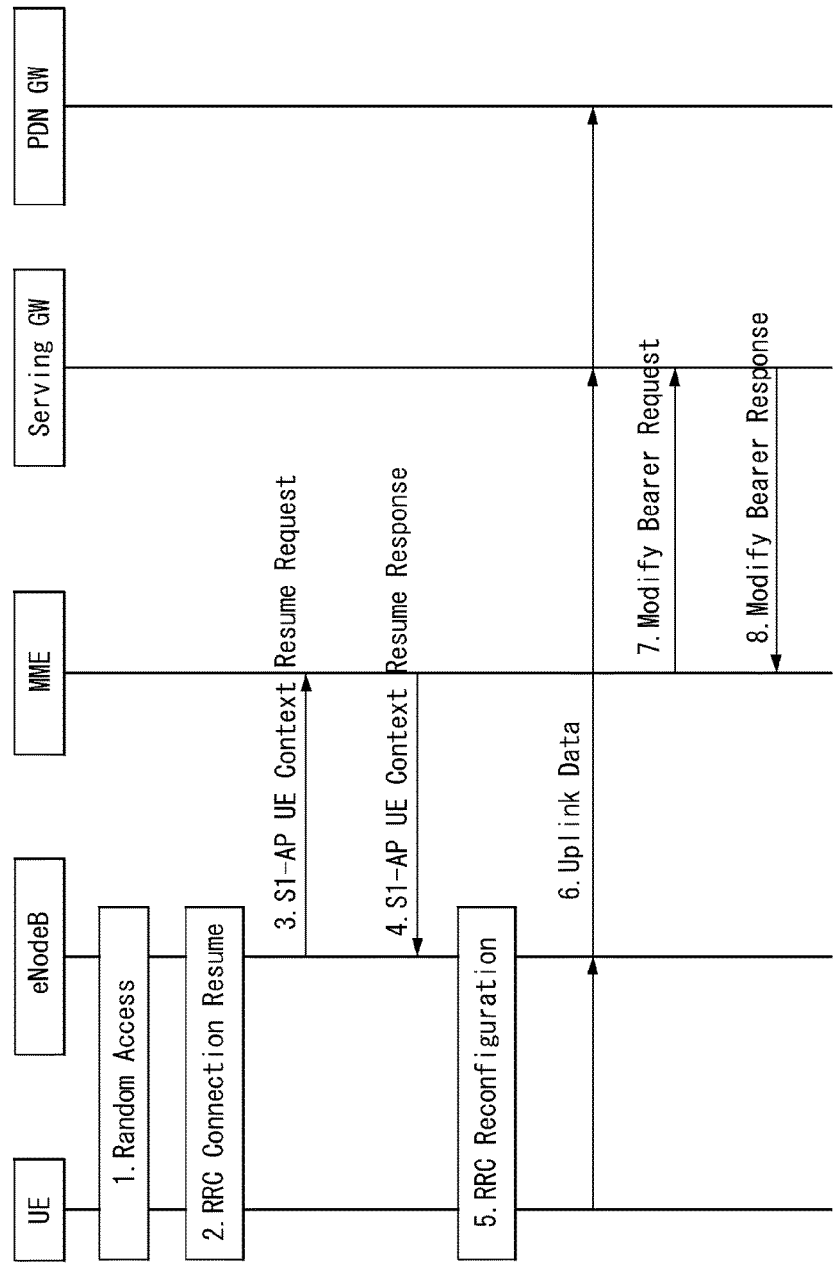
FIG. 9 illustrates a connection resume procedure initiated by UE.

FIG. 9 illustrates a connection resume procedure initiated by UE.

This procedure is used by the UE to resume the ECM-connection if the UE and the network support User Plane EPS Optimization and the UE has stored the necessary information to conduct the Connection Resume procedure. Otherwise the Service Request procedures are used.

1. The UE triggers the Random Access procedure to the eNodeB.

2. The UE triggers the RRC Connection Resume procedure including information needed by the eNodeB to access the UE's stored AS context. The E-UTRAN performs security checks. The eNodeB provides the UE with the list of the resumed radio bearers. EPS bearer state synchronization is performed between the UE and the network, i.e. the UE shall locally remove any EPS bearer for which no radio bearer is setup and which is not a Control Plane EPS bearer. If the radio bearer for a default EPS bearer is not established, the UE shall locally deactivate all EPS bearers associated to that default EPS bearer.

3. The eNodeB notifies the MME that the UE's RRC connection is resumed in the S1-AP UE Context Resume Request message including the list of rejected EPS bearers. The MME enters the ECM-CONNECTED state. The MME identifies that the UE returns at the eNodeB for which MME has stored data related to the S1AP association, UE Context and bearer context including the DL TEID(s), necessary to resume the connection.

If a default EPS bearer is not accepted by the eNodeB, all the EPS bearers associated to that default bearer shall be treated as non-accepted bearers. The MME releases the non-accepted and non-established bearers by triggering the bearer release procedure.

4. MME acknowledges the connection resumption in S1-AP UE Context Resume Response message including the list of rejected EPS bearers.

5. If the MME included in step 4a list of rejected EPS bearers, the eNodeB reconfigures the radio bearers.

6. The uplink data from the UE can now be forwarded by eNodeB to the Serving GW. The eNodeB sends the uplink data to the Serving GW address and TEID stored during the Connection Suspend procedure. The Serving GW forwards the uplink data to the PDN GW.

7. The MME sends a Modify Bearer Request message (eNodeB address, S1 TEID(s) (DL) for the accepted EPS bearers, Delay Downlink Packet Notification Request, RAT Type) per PDN connection to the Serving GW. If the Serving GW supports Modify Access Bearers Request procedure and if there is no need for the Serving GW to send the signaling to the PDN GW, the MME may send Modify Access Bearers Request (eNodeB address(es) and TEIDs for downlink user plane for the accepted EPS bearers, Delay Downlink Packet Notification Request) per UE to the Serving GW to optimize the signaling. The Serving GW is now able to transmit downlink data towards the UE.

The MME and the Serving GW clears the DL Data Buffer Expiration Time in their UE contexts if it was set, to remember that any DL data buffered for a UE using power saving functions has been delivered and to avoid any unnecessary user plane setup in conjunction with a later TAU.

8. The Serving GW shall return a Modify Bearer Response (Serving GW address and TEID for uplink traffic) to the MME as a response to a Modify Bearer Request message, or a Modify Access Bearers Response (Serving GW address and TEID for uplink traffic) as a response to a Modify Access Bearers Request message. If the Serving GW cannot serve the MME Request in the Modify Access Bearers Request message without S5/S8 signaling other than to unpause charging in the PDN GW or without corresponding Gxc signaling when PMIP is used over the S5/S8 interface, it shall respond to the MME with indicating that the modifications are not limited to S1-U bearers, and the MME shall repeat its request using a Modify Bearer Request message per PDN connection.

If SIPTO at the Local Network is active for a PDN connection with stand-alone GW deployment and the Local Home Network ID for stand-alone accessed by the UE differs from the Local Home Network ID where the UE initiated the SIPTO@LN PDN Connection, the MME shall request disconnection of the SIPTO at the local network PDN connection(s) with the "reactivation requested" cause value. If the UE has no other PDN connection, the MME initiated "explicit detach with reattach required" procedure.

If SIPTO at the Local Network is active for a PDN connection with collocated LGW deployment and the L-GW CN address of the cell accessed by the UE differs from the L-GW CN address of the cell where the UE initiated the SIPTO at the Local Network PDN Connection, the MME shall request disconnection of the SIPTO at the local network PDN connection(s) with the "reactivation requested" cause value. If the UE has no other PDN connection, the MME initiated "explicit detach with reattach required" procedure.

Suspend and Resume of the NAS Signaling Connection

Suspend of the NAS signaling connection can be initiated by the network in EMM-CONNECTED mode when User plane EPS optimization is used. Resume of the suspended NAS signaling connection is initiated by the UE.

In the UE, when User plane EPS optimization is used:
Upon indication from the lower layers that the RRC connection has been suspended, the UE shall enter EMM-IDLE mode with suspend indication, but shall not consider the NAS signaling connection released;

Upon trigger of a procedure using an initial NAS message when in EMM-IDLE mode with suspend indication, the UE shall request the lower layer to resume the RRC connection. In this request to the lower layer the NAS shall provide to the lower layer the RRC establishment cause and the call type according to annex D of this document;

Upon indication from the lower layers that the RRC connection has been resumed when in EMM-IDLE mode with suspend indication, the UE shall enter EMM-CONNECTED mode. If a SERVICE REQUEST message is pending, the message shall not be sent. If an initial NAS message different from SERVICE REQUEST message is pending, the message shall be sent; and (If a NAS message is discarded and not sent to the network, the uplink NAS COUNT value corresponding to that message is reused for the next uplink NAS message to be sent.)

Upon indication from the lower layers that the RRC connection resume has been fallbacked when in EMM-IDLE mode with suspend indication, the UE shall enter EMM-IDLE mode without suspend indication, send any pending initial NAS message and proceed as if RRC connection establishment had been requested;

Upon indication from the lower layers that the RRC connection resume has failed and indication from the lower layers that the RRC connection is suspended, the UE shall enter EMM-IDLE mode with suspend indication and restart the ongoing NAS procedure if required; and Upon indication from the lower layers that the RRC connection resume has failed and indication from the lower layers that the RRC connection is not suspended, the UE shall enter EMM-IDLE mode without suspend indication and restart the ongoing NAS procedure if required.

In the network, when User plane EPS optimization is used:
Upon indication from the lower layers that the RRC connection has been suspended, the network shall enter EMM-IDLE mode with suspend indication, but shall not consider the NAS signaling connection released; and Upon indication from the lower layers that the RRC connection has been resumed when in EMM-IDLE mode with suspend indication, the network shall enter EMM-CONNECTED mode.

Service Request Procedure

In the CP optimization, the NAS message and the procedure for sending a data over NAS are approved as follows. The NAS message including data in EMM-IDLE state is a Data Service Request message (or may be referred to as 'CONTROL PLANE SERVICE REQUEST message'), and the NAS message sent in EMM-CONNECTED state is an ESM DATA TRANSPORT message.

The purpose of the service request procedure is to transfer the EMM mode from EMM-IDLE to EMM-CONNECTED mode. If the UE is not using EPS services with CP-CIoT EPS optimization, this procedure is used to establish the radio and S1 bearers when user data or signaling is to be sent. If the UE is using EPS services with CP-CIoT EPS optimization, this procedure can be used for UE initiated transfer of user data via the control plane. Another purpose of this procedure is to invoke MO/MT CS fallback(CSFB) or 1xCS fallback procedures.

This procedure is used when:
the network has downlink signaling pending;
the UE has uplink signaling pending;
the UE or the network has user data pending and the UE is in EMM-IDLE mode;
the UE in EMM-IDLE or EMM-CONNECTED mode has requested to perform mobile originating/terminating CS fallback or 1xCS fallback;
the network has downlink cdma2000® signaling pending;
the UE has uplink cdma2000® signaling pending; or
the UE has to request resources for ProSe(Proximity Services) direct discovery or Prose direct communication.

Figure 10:
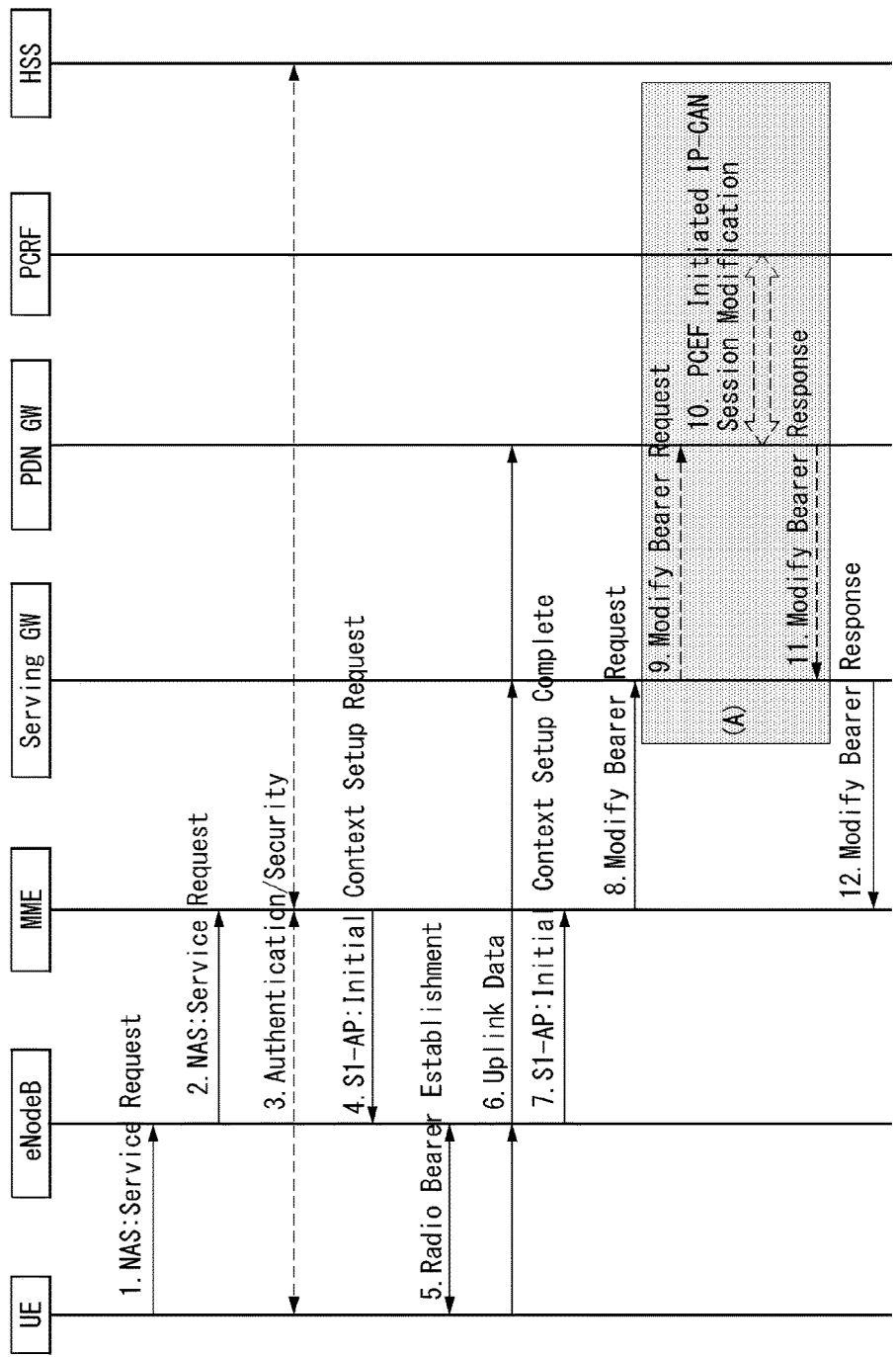
FIG. 10 illustrates a UE triggered Service request procedure.

FIG. 10 illustrates a UE triggered Service request procedure.

The Service Request procedure is triggered by the UE in ECM-IDLE status to establish user plane radio bearers for the UE.

The UE in ECM-IDLE state can also use this procedure to establish user plane radio bearers even if the UE applies Control Plane CIoT EPS optimization, when the UE and MME supports S1-U data transfer or User Plane EPS optimization in addition to Control Plane CIoT EPS optimization.

1. The UE sends NAS message Service Request towards the MME encapsulated in an RRC message to the eNodeB. The RRC message(s) that can be used to carry the S-TMSI and this NAS message.

2. The eNodeB forwards NAS message to MME. NAS message is encapsulated in an S1-AP: Initial UE Message (NAS message, TAI+ECGI of the serving cell, S-TMSI, CSG ID, CSG access Mode, RRC establishment cause). If the MME can't handle the Service Request it will reject it. CSG ID is provided if the UE sends the Service Request message via a CSG cell or a hybrid cell. CSG access mode is provided if the UE sends the Service Request message via a hybrid cell. If the CSG access mode is not provided but the CSG ID is provided, the MME shall consider the cell as a CSG cell.

If a CSG ID is indicated and CSG access mode is not provided, and there is no subscription data for this CSG ID and associated PLMN or the CSG subscription is expired, the MME rejects the Service Request with an appropriate cause. The UE shall remove the CSG ID and associated PLMN of the cell where the UE has initiated the service request procedure from the Allowed CSG list, if present.

For UEs with emergency EPS bearers, i.e. at least one EPS bearer has an ARP value reserved for emergency services, if CSG access restrictions do not allow the UE to get normal services the MME shall deactivate all non-emergency bearers and accept the Service Request.

If LIPA is active for a PDN connection and if the cell accessed by the UE does not link to the L-GW where the UE initiated the LIPA PDN Connection, the MME shall not request the establishment of the bearers of the LIPA PDN connection from the eNodeB in step 4 and shall request disconnection of the LIPA PDN connection. If the UE has no other PDN connection then the MME shall reject the Service Request with an appropriate cause value resulting in the UE detaching, skip the following steps of the procedure and initiate the release of the core network resources with the implicit MME-initiated Detach procedure.

If there is a "Availability after DDN Failure" monitoring event or a "UE Reachability" monitoring event configured for the UE in the MME, the MME sends an event notification.

To assist Location Services, the eNB indicates the UE's Coverage Level to the MME.

3. NAS authentication/security procedures may be performed.

4. The MME deletes S11-U related information in UE context if there is any, including TEID(DL) for the S11-U for Control Plane CIoT EPS optimization if data buffering is in the MME, ROHC context for Control Plane CIoT EPS optimization, etc, but not the Header Compression Configuration. The MME sends S1-AP Initial Context Setup Request (Serving GW address, S1-TEID(s) (UL), EPS Bearer QoS(s), Security Context, MME Signaling Connection Id, Handover Restriction List, CSG Membership Indication) message to the eNodeB. If there is a PDN connection established for Local IP Access, this message includes a Correlation ID for enabling the direct user plane path between the HeNB and the L-GW. If there is a PDN connection established for SIPTO at the Local Network with L-GW function collocated with the (H)eNB, this message includes a SIPTO Correlation ID for enabling the direct user plane path between the (H)eNB and the L GW. This step activates the radio and S1 bearers for all the active EPS Bearers. The eNodeB stores the Security Context, MME Signaling Connection Id, EPS Bearer QoS(s) and S1-TEID(s) in the UE RAN context.

In this release of the 3GPP specification the Correlation ID and SIPTO Correlation ID is set equal to the user plane PDN GW TEID (GTP-based S5) or GRE key (PMIP-based S5).

If the UE included support for restriction of use of Enhanced Coverage, the MME sends Enhanced Coverage Restricted parameter to the eNB in the S1-AP message.

The MME shall only request to establish Emergency EPS Bearer if the UE is not allowed to access the cell where the UE initiated the service request procedure due to CSG access restriction.

If the Service Request is performed via a hybrid cell, CSG Membership Indication indicating whether the UE is a CSG member shall be included in the S1-AP message from the MME to the RAN. Based on this information the RAN can perform differentiated treatment for CSG and non-CSG members.

5. The eNodeB performs the radio bearer establishment procedure. The user plane security is established at this step. When the user plane radio bearers are setup. EPS bearer state synchronization is performed between the UE and the network, i.e. the UE shall locally remove any EPS bearer for which no radio bearers are setup and, if the radio bearer for a default EPS bearer is not established, the UE shall locally deactivate all EPS bearers associated to that default EPS bearer.

6. The uplink data from the UE can now be forwarded by eNodeB to the Serving GW. The eNodeB sends the uplink data to the Serving GW address and TEID provided in the step 4. The Serving GW forwards the uplink data to the PDN GW.

7. The eNodeB sends an S1-AP message Initial Context Setup Complete (eNodeB address, List of accepted EPS bearers, List of rejected EPS bearers, S1 TEID(s) (DL)) to the MME. If the Correlation ID or SIPTO Correlation ID is included in step 4, the eNodeB shall use the included information to establish a direct user plane path to the L-GW and forward uplink data for Local IP Access or SIPTO at the Local Network with L-GW function collocated with the (H)eNB accordingly.

8. The MME sends a Modify Bearer Request message (eNodeB address, S1 TEID(s) (DL) for the accepted EPS bearers, Delay Downlink Packet Notification Request, RAT Type, MO Exception data counter) per PDN connection to the Serving GW. If the Serving GW supports Modify Access Bearers Request procedure and if there is no need for the Serving GW to send the signaling to the PGW, the MME may send Modify Access Bearers Request (eNodeB address(es) and TEIDs for downlink user plane for the accepted EPS bearers, Delay Downlink Packet Notification Request) per UE to the Serving GW to optimize the signaling. The Serving GW is now able to transmit downlink data towards the UE. If the PDN GW requested UE's location and/or User CSG information and the UE's location and/or User CSG information has changed, the MME also includes the User Location Information IE and/or User CSG Information IE in this message. If ISR is activated or if the Serving Network IE has changed compared to the last reported Serving Network IE then the MME also includes the Serving Network IE in this message. If the UE Time Zone has changed compared to the last reported UE Time Zone then the MME shall include the UE Time Zone IE in this message. If the internal flag Pending Network Initiated PDN Connection Signaling is set, the MME indicates UE available for end to end signaling in the Modify Bearer Request message and reset the flag. The MME only includes the MO Exception data counter if the RRC establishment cause is set to "MO exception data" and the UE is accessing via the NB-IoT RAT. The MME maintains the MO Exception Data Counter and sends it to the Serving GW.

The MME and the Serving GW clears the DL Data Buffer Expiration Time in their UE contexts if it was set, to remember that any DL data buffered for a UE using power saving functions has been delivered and to avoid any unnecessary user plane setup in conjunction with a later TAU.

If a default EPS bearer is not accepted by the eNodeB, all the EPS bearers associated to that default bearer shall be treated as non-accepted bearers. The MME releases the non-accepted bearers by triggering the bearer release procedure. If the Serving GW receives a DL packet for a non-accepted bearer, the Serving GW drops the DL packet and does not send a Downlink Data Notification to the MME.

9. If the RAT Type has changed compared to the last reported RAT Type or if the UE's Location and/or Info IEs and/or UE Time Zone and/or if ISR is not activated and Serving Network id and/or the indication UE available for end to end signaling are present in step 8, the Serving GW shall send the Modify Bearer Request message (RAT Type, MO Exception data counter) per PDN connection to the PDN GW. User Location Information IE and/or User CSG Information IE and/or Serving Network IE and/or UE Time Zone and/or the indication UE available for end to end signaling are also included if they are present in step 8.

If the Modify Bearer Request message is not sent because of above reasons and the PDN GW charging is paused, then the SGW shall send a Modify Bearer Request message with PDN Charging Pause Stop Indication to inform the PDN GW that the charging is no longer paused. Other IEs are not included in this message.

If the Modify Bearer Request message is not sent because of above reasons but the MME indicated the MO Exception data counter, then the Serving Gateway should notify the PDN GW that this RRC establishment cause has been used by the MO Exception Data Counter. The Serving GW indicates each use of this RRC establishment cause by the related counter on its CDR.

10. If dynamic PCC is deployed, the PDN GW interacts with the PCRF to get the PCC rule(s) according to the RAT Type by means of a PCEF initiated IP CAN Session Modification procedure. If dynamic PCC is not deployed, the PDN GW may apply local QoS policy.

The PDN GW indicates each use of the RRC establishment cause "MO Exception Data" by the related counter on its CDR.

11. The PDN GW sends the Modify Bearer Response to the Serving GW.

12. The Serving GW shall return a Modify Bearer Response (Serving GW address and TEID for uplink traffic) to the MME as a response to a Modify Bearer Request message, or a Modify Access Bearers Response (Serving GW address and TEID for uplink traffic) as a response to a Modify Access Bearers Request message. If the Serving GW cannot serve the MME Request in the Modify Access Bearers Request message without S5/S8 signaling other than to unpause charging in the PDN GW or without corresponding Gxc signaling when PMIP is used over the S5/S8 interface, it shall respond to the MME with indicating that the modifications are not limited to S1-U bearers, and the MME shall repeat its request using a Modify Bearer Request message per PDN connection.

If SIPTO at the Local Network is active for a PDN connection with stand-alone GW deployment and the Local Home Network ID for stand-alone accessed by the UE differs from the Local Home Network ID where the UE initiated the SIPTO@LN PDN Connection, the MME shall request disconnection of the SIPTO at the local network PDN connection(s) with the "reactivation requested" cause value. If the UE has no other PDN connection, the MME initiated "explicit detach with reattach required" procedure.

If SIPTO at the Local Network is active for a PDN connection with collocated LGW deployment and the L-GW CN address of the cell accessed by the UE differs from the L-GW CN address of the cell where the UE initiated the SIPTO at the Local Network PDN Connection, the MME shall request disconnection of the SIPTO at the local network PDN connection(s) with the "reactivation requested" cause value. If the UE has no other PDN connection, the MME initiated "explicit detach with reattach required" procedure.

The service request procedure is initiated by the UE, however, for the downlink transfer of signaling, cdma2000® signaling or user data in EMM-IDLE mode, the trigger is given by the network by means of the paging procedure.

The UE shall invoke the service request procedure when:
a) the UE in EMM-IDLE mode receives a paging request with CN domain indicator set to "PS" from the network;
b) the UE, in EMM-IDLE mode, has pending user data to be sent;
c) the UE, in EMM-IDLE mode, has uplink signaling pending;
d) the UE in EMM-IDLE or EMM-CONNECTED mode is configured to use CS fallback and has a mobile originating CS fallback request from the upper layer;

e) the UE in EMM-IDLE mode is configured to use CS fallback and receives a paging request with CN domain indicator set to "CS", or the UE in EMM-CONNECTED mode is configured to use CS fallback and receives a CS SERVICE NOTIFICATION message;

f) the UE in EMM-IDLE or EMM-CONNECTED mode is configured to use 1xCS fallback and has a mobile originating 1xCS fallback request from the upper layer;

g) the UE in EMM-CONNECTED mode is configured to use 1xCS fallback and accepts cdma2000® signaling messages containing a 1xCS paging request received over E-UTRAN;

h) the UE, in EMM-IDLE mode, has uplink cdma2000® signaling pending to be transmitted over E-UTRAN;

i) the UE, in EMM-IDLE or EMM-CONNECTED mode, is configured to use 1xCS fallback, accepts cdma2000® signaling messages containing a 1xCS paging request received over cdma2000® 1xRTT, and the network supports dual Rx CSFB or provide CS fallback registration parameters;

j) the UE, in EMM-IDLE or EMM-CONNECTED mode, has uplink cdma2000® signaling pending to be transmitted over cdma2000® 1xRTT, and the network supports dual Rx CSFB or provide CS fallback registration parameters (see 3GPP TS 36.331 [22]);

k) the UE performs an inter-system change from S101 mode to S1 mode and has user data pending; or l) the UE in EMM-IDLE mode has to request resources for ProSe direct discovery or Prose direct communication.

If one of the above criteria to invoke the service request procedure is fulfilled, then the service request procedure may only be initiated by the UE when the following conditions are fulfilled:

its EPS update status is EU1 UPDATED, and the TAI of the current serving cell is included in the TAI list; and
no EMM specific procedure is ongoing.

Figure 11:
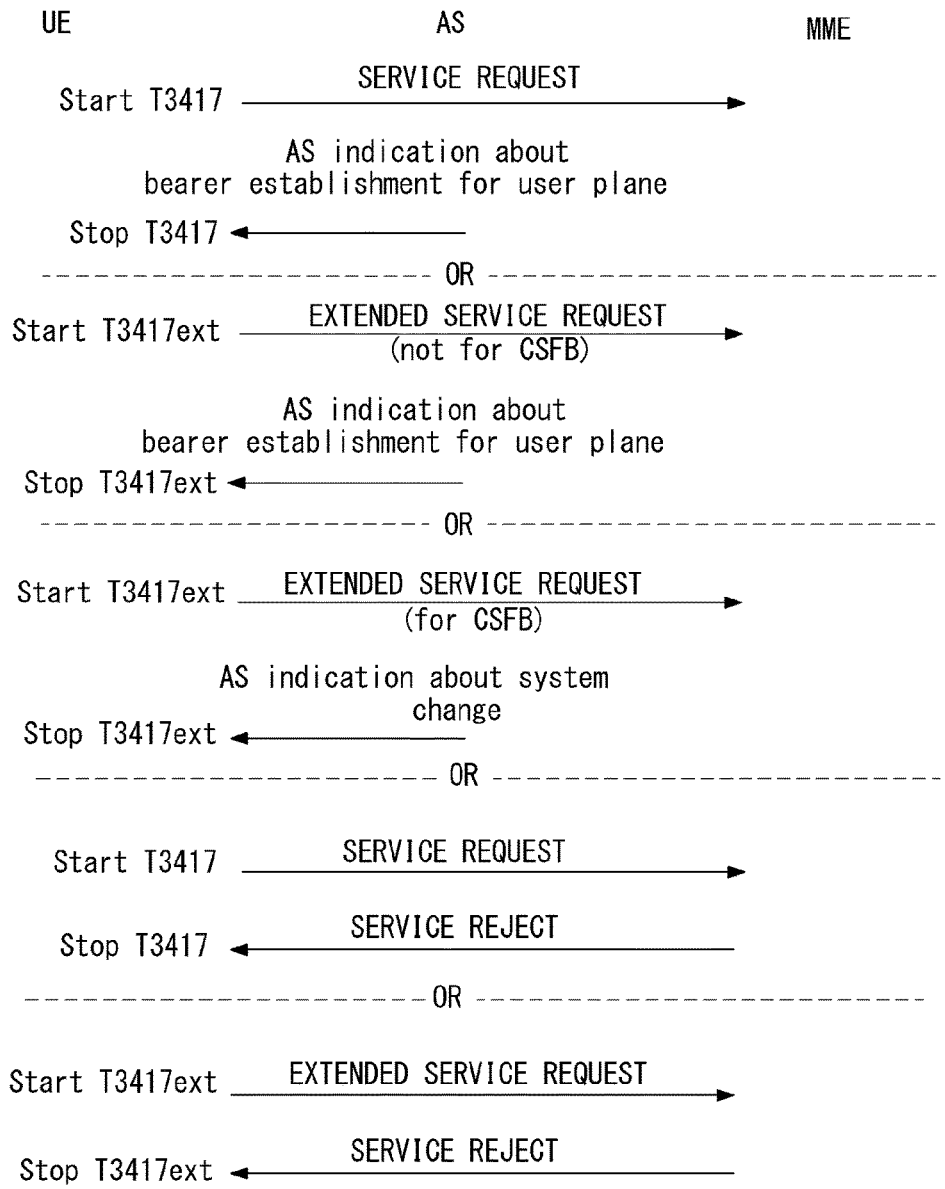
FIG. 11 is a diagram illustrating a timer operation in a service request procedure for a user plane (part 1).

FIG. 11 is a diagram illustrating a timer operation in a service request procedure for a user plane (part 1).

Referring to FIG. 11, when a UE transmits a service request message to an MME through an AS layer, the UE may initiate T3417 timer, and when the UE receives an AS indication with respect to a bearer establishment for a user plane from the AS layer, the UE may stop T3417 timer. Or, when the UE transmits an extended service request message (not for CSFB) to the MME through the AS layer, the UE may initiate T3417ext timer, and when the UE receives an AS indication with respect to a bearer establishment for a user plane from the AS layer, the UE may stop T3417ext timer. Or, when the UE transmits an extended service request message (for CSFB) to the MME through the AS layer, the UE may initiate T3417ext timer, and when the UE receives an AS indication with respect to a system change from the AS layer, the UE may stop T3417ext timer. Or, when the UE transmits a service request message to an MME through an AS layer, the UE may initiate T3417 timer, and when the UE receives the service reject message from the MME, the UE may stop T3417 timer. Or, when the UE transmits an extended service request message to the MME through the AS layer, the UE may initiate T3417ext timer, and when the UE receives a service reject message from the MME, the UE may stop T3417ext timer.

AS indications (indications from lower layers) are results of procedures triggered by MME in service request procedure. Triggered procedures could be e.g. RRC connection reconfiguration procedure and inter system PS handover to GERAN or UTRAN procedure as a result of CSFB procedure.

For 1xCS fallback, the UE sends the EXTENDED SERVICE REQUEST message and starts timer T3417ext. The procedure is considered completed upon receiving indication of system change from AS.

Figure 12:
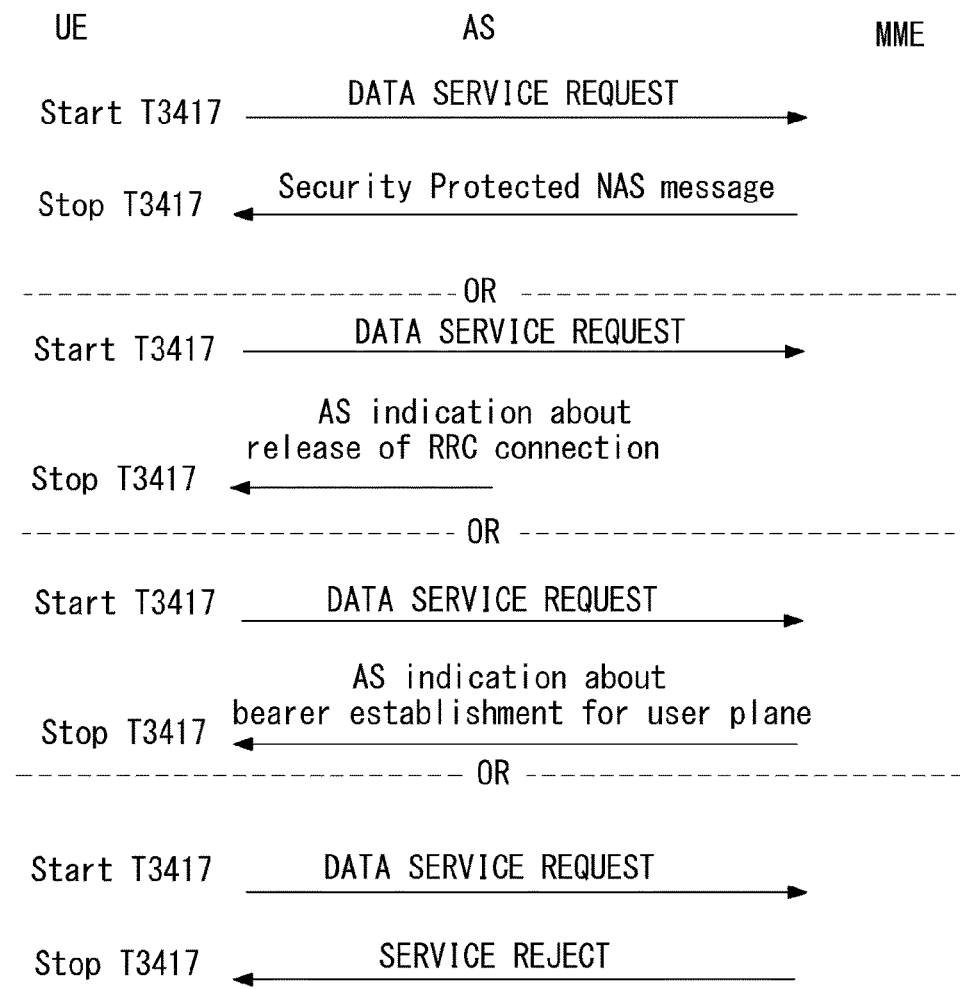
FIG. 12 is a diagram illustrating a timer operation in a service request procedure for a control plane (part 2).

FIG. 12 is a diagram illustrating a timer operation in a service request procedure for a control plane (part 2).

Referring to FIG. 12, when a UE transmits a data service request message to an MME through an AS layer, the UE may initiate T3417 timer, and when the UE receives a security protected NAS message from the MME, the UE may stop T3417 timer. Or, when the UE transmits a data service request message to the MME through an AS layer, the UE may initiate T3417 timer, and the UE receives an AS indication with respect to a release of an RRC connection from the AS layer, the UE may stop T3417 timer. Or, when the UE transmits a data service request message to the MME through an AS layer, the UE may initiate T3417 timer, and when the UE receives an AS indication with respect to a bearer establishment for a user plane from the MME, the UE may stop T3417 timer. Or, when the UE transmits a data service request message to the MME through an AS layer, the UE may initiate T3417 timer, and when the UE receives a service reject message from the MME, the UE may stop T3417 timer.

Security protected NAS message could be e.g. a SECURITY MODE COMMAND, SERVICE ACCEPT, or ESM DATA TRANSPORT message.

AS indications (indications from lower layers) are results of procedures triggered by MME in service request procedure. Triggered procedures could be e.g. an RRC connection release procedure or RRC connection reconfiguration procedure.

A service request attempt counter is used to limit the number of service request attempts and no response from the network.

The service request attempt counter shall be reset when:
an attach or combined attach procedure is successfully completed;
a normal or periodic tracking area updating or a combined tracking area updating procedure is successfully completed; or
a service request procedure in order to obtain packet services is successfully completed.

If the UE is not using EPS services with CP-CIoT EPS optimization, the network shall consider the service request procedure successfully completed in the following cases:
when it receives an indication from the lower layer that the user plane is setup, if radio bearer establishment is required;
otherwise when it receives an indication from the lower layer that the UE has been redirected to the other RAT (GERAN or UTRAN in CS fallback, or cdma2000® 1x access network for 1xCS fallback).

Service Request Procedure Initiation

1. When UE is not Using EPS Services with CP-CIoT EPS Optimization.

For cases a, b, c, h, k and l in invoking service request procedure of UE:
if the UE is not configured for NAS signaling low priority, the UE initiates the service request procedure by sending a SERVICE REQUEST message to the MME;
if the UE is configured for NAS signaling low priority, and the last received ATTACH ACCEPT message or TRACKING AREA UPDATE ACCEPT message from the network indicated that the network supports use of EXTENDED SERVICE REQUEST for packet services, the UE shall send an EXTENDED SERVICE REQUEST message with service type set to "packet services via S1"; or (A UE configured for dual priority is configured for NAS signaling low priority indicator)

if the UE is configured for NAS signaling low priority and the last received ATTACH ACCEPT message or TRACKING AREA UPDATE ACCEPT message from the network did not indicate that the network supports use of EXTENDED SERVICE REQUEST for packet services, the UE shall instead send a SERVICE REQUEST message.

For cases a, b, c, h, k and l, after sending the SERVICE REQUEST message or the EXTENDED SERVICE REQUEST message with service type set to "packet services via S1", the UE shall start T3417 and enter the state EMM-SERVICE-REQUEST-INITIATED.

For case d, the UE shall send an EXTENDED SERVICE REQUEST message, start T3417ext and enter the state EMM-SERVICE-REQUEST-INITIATED.

For case e:
if the UE is in EMM-IDLE mode, the UE shall send an EXTENDED SERVICE REQUEST message, start T3417ext and enter the state EMM-SERVICE-REQUEST-INITIATED;
if the UE is in EMM-CONNECTED mode and if the UE accepts the paging, the UE shall send an EXTENDED SERVICE REQUEST message with the CSFB response IE indicating "CS fallback accepted by the UE", start T3417ext and enter the state EMM-SERVICE-REQUEST-INITIATED; or
if the UE is in EMM-CONNECTED mode and if the UE rejects the paging, the UE shall send an EXTENDED SERVICE REQUEST message with the CSFB response IE indicating "CS fallback rejected by the UE" and enter the state EMM-REGISTERED.NORMAL-SERVICE. The network shall not initiate CS fallback procedures.

For cases f, g, i and j, the UE shall send an EXTENDED SERVICE REQUEST message, start T3417 and enter the state EMM-SERVICE-REQUEST-INITIATED.

2. When UE is Using EPS Services with CP-CIoT EPS Optimization

The UE shall send a DATA SERVICE REQUEST message, start T3417 and enter the state EMM-SERVICE-REQUEST-INITIATED.

For case a, the data service type of the DATA SERVICE REQUEST message shall indicate "mobile terminating request". The UE shall set the length indicator of the ESM message container IE to zero and not include any ESM message.

For case b, the data service type of the DATA SERVICE REQUEST message shall indicate "mobile originating request". The UE shall include an ESM DATA TRANSPORT message in the ESM message container IE. For case c, the data service type of the DATA SERVICE REQUEST message shall indicate "mobile originating request". The UE shall set the length indicator of the ESM message container IE to zero and not include any ESM message.

Resume Procedure

Figure 13:
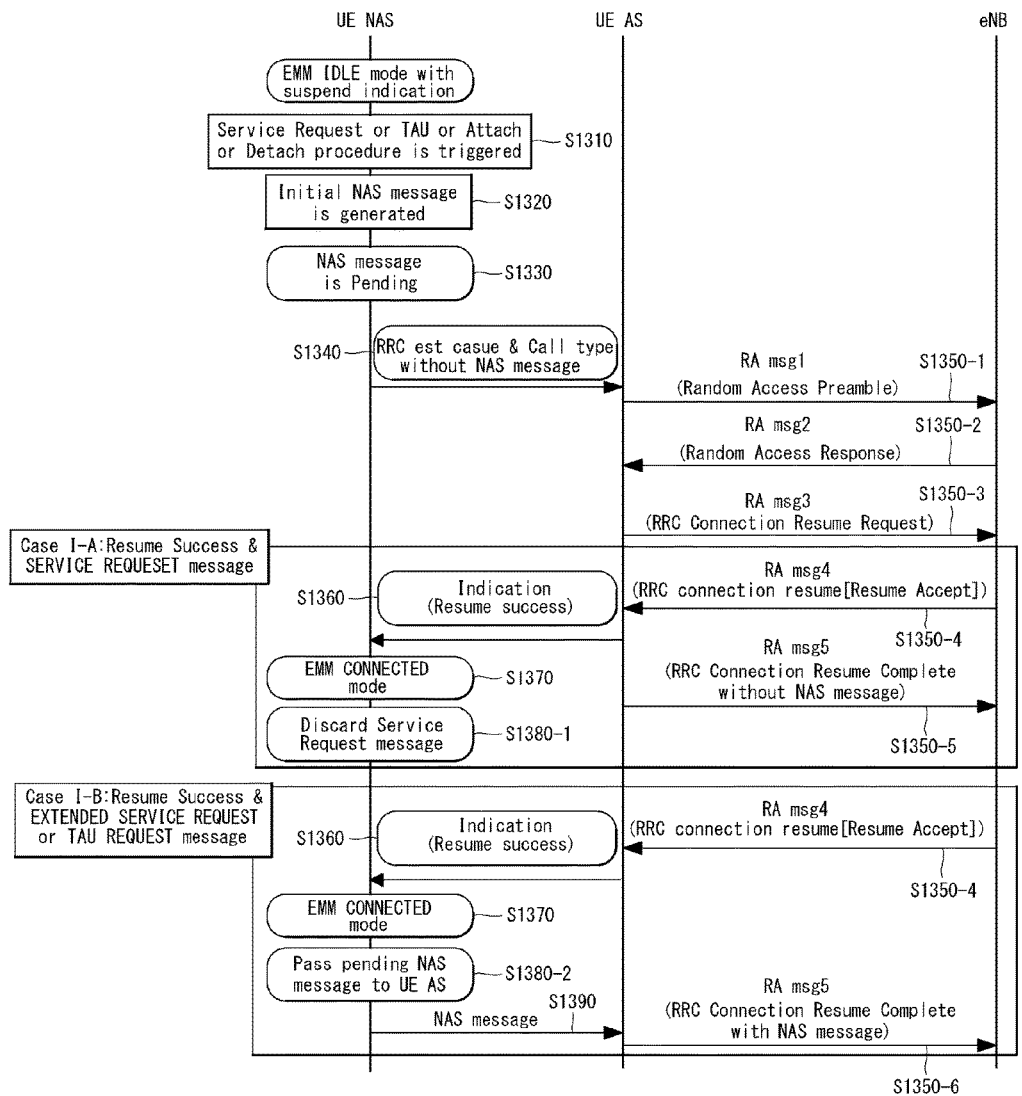
FIG. 13 is a flowchart illustrating a resume procedure to which the present invention may be applied.

FIG. 13 is a flowchart illustrating a resume procedure to which the present invention may be applied. In this flowchart, it is assumed that a UE is in the EMM-IDLE mode with suspend indication by the connection suspend procedure described above.

First, in a NAS layer of the UE, a service request, TAU, attach or detach procedure may be triggered (step, S1310). As a result, an initial NAS message is generated (step, S1320), and it may be pending in the NAS layer (step, S1330).

The NAS layer of the UE may transmit an RRC connection/establishment cause value (RRC est cause) and a call type to an AS layer, which is a lower layer first, except the generated NAS message (step, S1340). As a result, the AS layer of the UE may perform a Random access procedure below (step, S1350). The description described with reference to FIG. 6 may be identically applied to the detailed description of the Random access procedure, and the difference from FIG. 6 will be mainly described below.

First, the UE (or the AS layer of the UE) may transmit msg 1 (i.e., RA msg 1) including a random access preamble to an eNB (step, S1350-1), and in response to it, the UE may receive msg 2 (i.e., RA msg 2) including a random access response (step, S1350-2). Next, the UE (or the AS layer of the UE) may transmit msg 3 (i.e., RA msg 3) including an RRC connection resume request message that requests resume of the RRC connection to the eNB (step, S1350-3). In response to the RRC connection resume request of the UE, the eNB may transmit msg 4 (i.e., RA msg 4) including a RRC connection resume message that accepts the resume of the UE, a RRC connection setup message that rejects the resume of the UE, or a RRC connection reject message that rejects the RRC connection of UE, to the UE (step, S1350-4).

When the UE receives the RRC connection setup message from the eNB, the UE may not resume the RRC connection. When the UE receives the RRC connection resume message, the UE may resume the RRC connection. In particular, when the UE receives the RRC connection setup message from the eNB, the UE can continue the NAS procedure through a fallback. That is, the UE receiving the RRC connection setup message may transmit an indication that the RRC connection is fallbacked from the UE AS layer to the UE NAS layer in order to fallback the RRC connection resume. In this case, the UE (in particular, the NAS layer of the UE) may transmit an initial NAS message currently pending(i.e., the initial NAS message generated in step S1320) through the msg 5 (i.e., the RA msg 5) to the eNB, and may enter an EMM-IDLE mode/state without the suspend indication.

When the UE receives the RRC connection reject message from the eNB, the UE may restart the NAS procedure (using the initial NAS message generated in step S1320) from the beginning. In this specification, restarting the NAS procedure from the beginning (using the initial NAS message generated in step S1320) means restarting from the random access procedure by returning to the step S1350-1 of transmitting the msg 1 (i.e., RA msg 1). The RRC connection reject message may include an indication of whether to maintain the RRC connection suspend. If the indication indicates a suspend of the RRC connection, the UE AS layer may send an indication that the RRC connection resume is failed and the RRC connection is suspended, to the UE NAS layer. In this case, the UE may enter the EMM-IDLE mode/state with a suspend indication and restart the NAS procedure from the beginning (if necessary). In contrast, if the indication indicates that the RRC connection is not suspended, the UE AS layer may send an indication that the RRC connection resume is failed and the RRC connection is not suspended, to the UE NAS layer. In this case, the UE may enter an EMM-IDLE mode/state without the suspend indication and may restart the NAS procedure from the beginning (if necessary).

The procedure for the UE to resume the RRC connection may be divided into two cases (Case 1-A and Case 1-B) below according to the procedure types triggered in the UE NAS layer, and the procedure may be differently progressed for each case.

Case 1-A: When a Service request procedure is triggered.

The AS layer of the UE that receives msg 4 including the RRC connection resume message may indicate that the resume is succeeded/accepted to the UE NAS layer (i.e., RRC connection resume indication transmission) (step, S1360). The NAS layer of the UE may be switched from the EMM-IDLE mode/state with suspend indication to the EMM connected mode/state (step, S1370). Next, the UE NAS layer may discard the service request message, which is a pending NAS message in step, S1330 (step, S1380-1).

Meanwhile, after notifying that the resume is succeeded/accepted, (during a preconfigured time) the UE AS layer that fails to receive a NAS message from the UE NAS layer may transmit msg 5 (i.e., RA msg 5) to the eNB (step, S1350-2). The msg 5(i.e., RA msg 5) includes an RRC connection resume complete message without NAS message.

Case 1-B: When the procedure (e.g., Extended service request, TAU, Attach or Detach procedure) except the service request is triggered.

The AS layer of the UE that receives msg 4 including the RRC connection resume message may indicate that the resume is succeeded/accepted to the UE NAS layer (i.e., RRC connection resume indication transmission) (step, S1360). The UE(or NAS layer of the UE) may be switched from the EMM-IDLE mode/state with suspend indication to the EMM connected mode/state (step, S1370). Next, the UE NAS layer may send the NAS message (e.g., Extended service request, TAU, Attach or Detach request message) that is pending in step, S1330 to the UE AS layer (steps, S1380-2 and S1390). After notifying that the resume is succeeded/accepted, (during a preconfigured time) the UE AS layer that receives the NAS message from the UE NAS layer may notify that the RRC connection resume is completed, and may transmit the RRC connection resume complete message including the NAS message received from the NAS layer to the eNB by including the RRC connection resume complete message in the msg 5(i.e. RA msg 5) (step, S1350-6).

The embodiment according to FIG. 13 may be defined as a resume procedure of the form in which steps 1 and 2 are associated in the resume procedure described in relation to FIG. 9 above. Accordingly, after Case 1-A or Case 1-B is performed in FIG. 13, subsequently, steps 3 to 8 of FIG. 9 may be performed.

When arranging the resume procedure according to FIG. 9 to FIG. 13, the UE commonly performs the resume procedure operation in a User plane EPS optimization in the order (steps 1 to 5) below.

That is, when uplink data or uplink signaling(e.g., ESM signaling) is generated in the UE or the UE receives a paging message, the Service Request procedure is triggered, and accordingly, the Extended Service Request message or the Service Request message may be generated as an initial NAS message (hereinafter, step 1). In the case that the NAS layer of the UE receives an RRC connection resume indication from the AS layer of the UE (or in the case that an RRC connection is resumed), the UE (NAS layer) regards it as an accept/success response to the Extended Service Request message or the Service Request message, and establishes a user plane bearer (i.e., switches to the EMM connected mode/state) (hereinafter, step 2). In the case that the generated initial NAS message is the Extended Service Request message, the UE (NAS layer) transmits the Extended Service Request message, and in the case that the generated initial NAS message is the Service Request message, the UE (NAS layer) does not transmit the Service Request message (hereinafter, step 3). As such, the UE (NAS layer) that establishes the user plane bearer by regarding the RRC connection resume indication as a response of success to the service request initiates a transmission of uplink data or uplink signaling(e.g., ESM signaling) (hereinafter, step 4).

Referring to steps 1 to 5 described above, although the MME does not accept the service request of the UE actually, the UE regards the RRC connection resume indication received from the eNB as a response of accepting the service request, and initiates/performs a UL transmission. This may not be problematic in the case that the MME accepts the service request of the UE later, but may be problematic in the case that the MME reject the service request of the UE according to a predetermined condition (hereinafter, step 5).

That is, when the UE regard the acceptance of the NAS message first and transmits the NAS message at a later time, various problems may occur as described below when reject is received as the actual response to the NAS message.

First, the Extended Service Request message (not for CSFB) and the Service Request message are generated when the Service Request procedure is triggered. The triggering condition of the Service Request procedure may be configured to the case that uplink data or uplink signaling(e.g., ESM signaling) that is going to be transmitted is generated.

a) the UE in EMM-IDLE mode receives a paging request with CN domain indicator set to "PS" from the network;

b) the UE, in EMM-IDLE mode, has pending user data to be sent;

c) the UE, in EMM-IDLE mode, has uplink signaling pending;

In the case that it is assumed that step 1 is a start of the Service request procedure and step 5 is an end of the Service request procedure (i.e., in the case of steps 1 to 5 as a Service request procedure), the problem occurs that there is a discrepancy between the standard defined as below and the resume procedure described above.

The transport of NAS messages procedure and the generic transport of NAS messages procedure cannot be initiated while an EMM specific procedure or a service request procedure is ongoing. That is, in the case that the uplink data generated in step 1 should be transmitted through a transport NAS message, the transport NAS message may not be transmitted while the service request procedure is ongoing.

Except for the attach procedure, during EMM procedures the UE shall suspend the transmission of ESM messages. That is, in the case that the uplink signaling generated in step 1 is an ESM (EPS Session Management) message, the UE should suspend the ESM message while the service request procedure (EMM procedure) is performed.

That is, in the case that step 5 is regarded as an end of the service request procedure, a transmission of uplink data or uplink signaling generated in step 1 may be performed after step 5. However, in the case that the MME accepts the service request of the UE, step 5 is not performed. The response for notifying the accept operation of the MME is not separately defined currently. This is because the UE regards the RRC connection resume indication as the accept response to the service request.

Therefore, in the case that the MME accepts the service request, there is no response from the MME and step 5 is not performed, and the NAS layer is impossible to perform the operation of transmitting uplink data/signaling generated in step 1 by waiting for the response from the MME in step 5.

Or, in the case that step 1 is regarded as a start of the service request procedure and step 3 is regarded as an end of the service request procedure, and the UE initiates a transmission of uplink data/signaling after up to step 3 is completed, there is a problem that the case of receiving a reject response to the service request procedure from the MME later.

In addition, the problem may occur that the application of T3417/T3417ext, which are timers predefined in the standard in relation to the service request procedure to the resume procedure is unclear/obscure. This will be described below with reference to FIG. 14.

Figure 14:
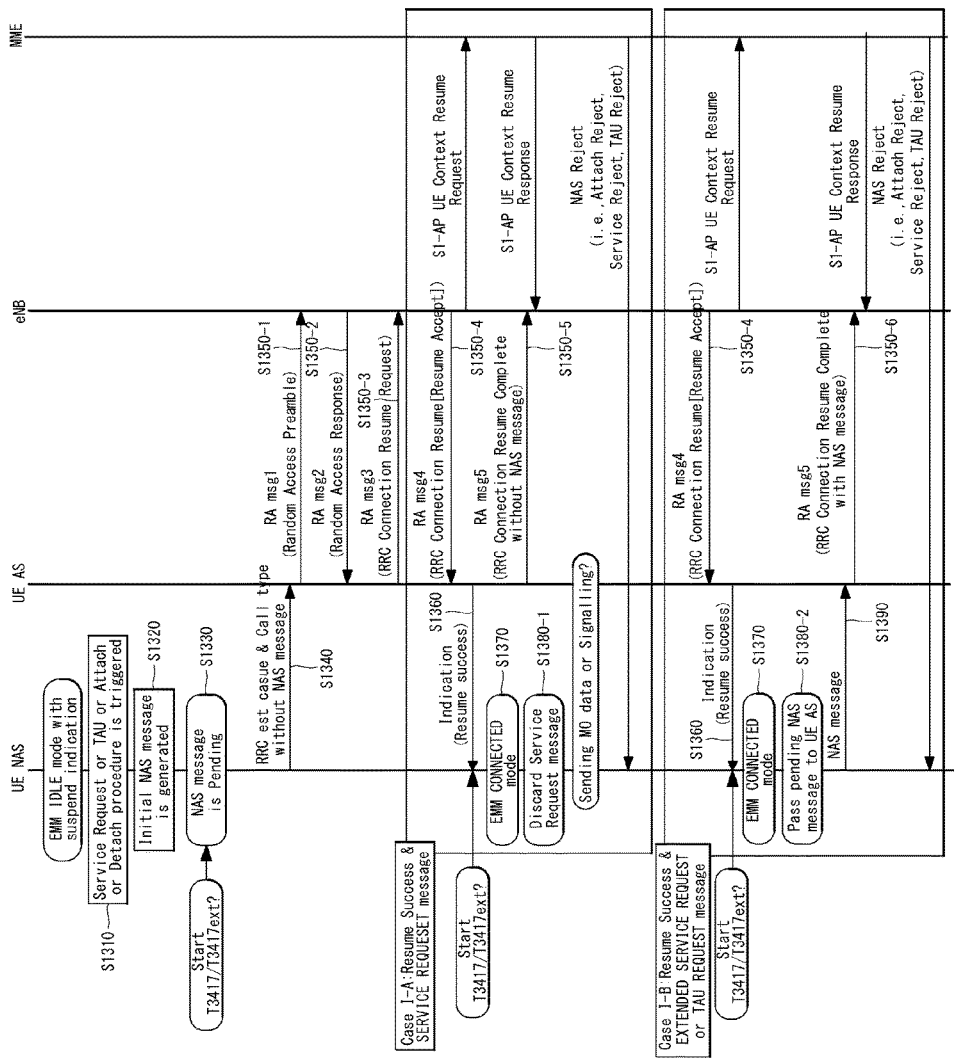
FIG. 14 is a diagram illustrating a timer operation in a resume procedure according to an embodiment of the present invention.

FIG. 14 is a diagram illustrating a timer operation in a resume procedure according to an embodiment of the present invention. The description described with reference to FIGS. 9 to 13 may be identically applied to the detailed description of the Random access procedure, and the overlapped description will be omitted.

In describing the timer operation in relation to the conventional service request procedure, while transmitting a Service request message/Extended service request message, the UE (NAS layer) starts a timer (T3417/extT3417) for identifying whether the message transmission is succeeded (or whether to accept/reject the message transmission). Later, when receiving a response to the Service request message/Extended service request message, the UE (NAS layer) stops the timer. And in the case that the UE (NAS layer) fails to receive a response until the timer is expired, the UE (NAS layer) performs a predefined operation. In this case, the response of stopping the timer of the UE (NAS layer) includes a service reject or a (UE) AS indication for User plane bearer establishment and System change.

However, in the resume procedure operation, the operation of timer (T3417/extT3417) is not clearly described. Accordingly, with reference to FIG. 14, the operation of timer (T3417/extT3417) that may be proposed in the resume procedure is proposed below. However, before proposing such a timer operation, a detailed resume procedure steps (A to C) to which a timer may be applied will be described as below.

A. When the NAS layer of the UE receives an indication that an RRC connection is suspended from a lower layer (AS/RRC layer), the UE enters the EMM-IDLE mode/state with suspend indication.

B. When the procedure for transmitting/using an initial NAS message is triggered to the UE (NAS layer) in the EMM-IDLE mode/state with suspend indication, the UE (NAS layer) pends the corresponding initial NAS message, and transmits only the RRC establishment cause and the call type to the lower layer (AS/RRC layer).

C. When the UE (NAS layer) receives an indication that the RRC connection resume is accepted from the lower layer (AS/RRC layer), the UE (NAS layer) is switched to the EMM-CONNECTED mode/state. In the case that the initial NAS message which is suspended by the NAS layer is the Service Request message, the corresponding initial NAS message may not be transmitted (to the lower layer (AS/RRC layer)). On the contrary, in the case that the initial NAS message which is suspended by the NAS layer is other message (e.g., Extended service request, TAU, Attach or Detach request message), than the Service Request message, the corresponding initial NAS message may be transmitted (to the lower layer (AS/RRC layer)).

In this case, as an operation time of the timer (T3417/extT3417), the following embodiments may be proposed.

First embodiment) Start the timer (T3417/extT3417) in step B (or step, S1330)

Second embodiment) Start the timer (T3417/extT3417) in step C (or step, S1360)

In the case of the first embodiment, the detailed operation of the timer (T3417/extT3417) in steps B and C of the resume procedure is as follows.

B. Start the timer (T3417/extT3417)

According to the conventional operation, the indication that the RRC connection is resumed is regarded as a User plane bearer establishment accept indication, and this may be interpreted as a success for the service request.

C. In the case that the initial NAS message is sent to the MME and the MME transmits a NAS reject message (e.g. Service Reject message) in response to the initial NAS message to the UE, the corresponding NAS reject message may be sent to the NAS layer of the UE.

In the case that the initial NAS message is not the Service request message, the corresponding initial NAS message is transmitted to the lower layer. In this case, when the corresponding initial NAS message is sent to the MME, the MME may transmit a NAS accept/reject in response to the corresponding message to the NAS layer of the UE.

In the case of step C, when the UE (NAS layer) receives the Service Reject message, the UE (NAS layer) should stop the timer (T3417/extT3417) according to the conventional operation. However, since the timer is already stopped in step B above, the timer is no further stopped.

In the case of the second embodiment, when the timer (T3417/extT3417) is started in step C, the indication that the RRC connection is resumed may not influence on the timer, and when the Service reject message is received in step C, the timer (T3417/extT3417) may be stopped. However, in the case that the Service reject message is not received (i.e., in the case that the service request is accepted), a response which is indicative of stopping the timer is not transmitted from a network (MME).

That is, in the case of accept/success of the network in response to the service request, since an additional indication for the UE (NAS layer) is not sent, the UE (NAS layer) is unable to identify the success/accept for the service request and may not stop the timer (T3417/extT3417). This is because the additional indication in the network (MME) is not required since the UE (NAS layer) regards the RRC connection resume indication received in step B as a success/accept response to the service request.

The case in which the problems described above may occur will be described in detail for each type of the initial NAS message below. The initial NAS message may include a Service Request message, an Extended Service Request message, a TAU request message, a Data Service Request message, an Attach request message and a Detach request message.

The service request message is not transmitted by the UE (NAS layer) even in the case that the RRC connection is resumed. Accordingly, in this case, when the MME rejects the service request later, the post processing problem may occur as described above.

The Extended Service Request (ESR) message is divided into the case that the ESR message is generated or not generated for the CSFB. In the case of the ESR message generated for the CSFB, an indication for system change is transmitted to the UE NAS layer from the UE lower layer (AS/RRC layer). In this case, the UE NAS layer may regard the system change indication as accept/success response for the ESR message transmission(for CSFB). This may mean that the UE NAS layer may regard the system change indication, instead of the Resume success indication, as accept for the ESR message(for CSFB). In this case, since the NAS layer receives accept/reject response for the ESR message explicitly, as described above, the post processing problem that may occur as regarding the resume success indication as an accept response may not occur. However, in the case of the ESR message which is not generated for the CSFB, a response to success/accept is not separately defined, and accordingly the post processing problem described above may occur.

Even in the case of the TAU request message, since the TAU accept message may be regarded as success/accept response to the TAU request message, the post processing problem described above may not occur. And, until the TAU procedure is terminated, other procedure (e.g. EMM or ESM procedure) is not proceeded, but after the TAU procedure is terminated (e.g., the UE (NAS) receives the TAU reject message or the TAU accept message), other procedure (e.g. EMM or ESM procedure) may be proceeded.

That is, the post processing problem in relation to a (reject) response that may occur as regarding the resume success indication as an accept response may occur for the following cases.

The case that the Extended Service Request message is generated/pended from other reason, not the CSFB (or an Extended Service request procedure is triggered from other reason other than the CSFB), and the RRC connection is resumed The case that the Service Request message is generated/pended (or a Service request procedure is triggered), and the RRC connection is resumed (in this case, the Service Request message is not transmitted to the lower layer from the NAS layer)

Accordingly, in the case that the UE (NAS layer) in the EMM-IDLE mode/state with suspend indication performs the Service Request procedure for transmitting uplink data/uplink signaling, the present specification is to propose a method for solving various problems that may occur in the case that the RRC connection is resumed.

Meanwhile, the Service type information element of the Extended Service Request message which is generated/pended from other reason, not the CSFB may be configured to indicate "packet services via S1" according to Tables 2 and 3 below. That is, the Extended Service Request message which is generated or pended from other reason, not the CSFB may be represented as the Extended Service Request message configured to indicate "packet services via S1" by the Service type information element. Table 2 below exemplifies the contents of the Extended Service Request message, and Table 3 exemplifies the service type information element.

TABLE 2

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Extended service request message identity | Message type 9.8 | M | V | 1 |
|  | Service type | Service type 9.9.3.27 | M | V | ½ |
|  | NAS key set identifier | NAS key set identifier 9.9.3.21 | M | V | ½ |
|  | M-TMSI | Mobile identity 9.9.2.3 | M | LV | 6 |
| B- | CSFB response | CSFB response 9.9.3.5 | C | TV | 1 |
| 57 | EPS bearer context status | EPS bearer context status 9.9.2.1 | O | TLV | 4 |
| D- | Device properties | Device properties 9.9.2.0A | O | TV | 1 |

TABLE 3

Service type value (octet 1)
Service type value

| Bits | | | | |
|---|---|---|---|---|
| 4 | 3 | 2 | 1 | |
| 0 | 0 | 0 | 0 | mobile originating CS fallback or 1xCS fallback. |
| 0 | 0 | 0 | 1 | mobile terminating CS fallback or 1xCS fallback. |
| 0 | 0 | 1 | 0 | mobile originating CS fallback emergency call or 1xCS fallback emergency call. |
| 0 | 0 | 1 | 1 | unused; shall be interpreted as "mobile originating CS fallback or 1xCS fallback", if received by the network. |
| 0 | 1 | 0 | 0 | unused; shall be interpreted as "mobile originating CS fallback or 1xCS fallback", if received by the network. |
| 1 | 0 | 0 | 0 | packet service via S1. |
| 1 | 0 | 0 | 1 | unused; shall be interpreted as "packet services via S1", if received by the network. |
| 1 | 0 | 1 | 0 | unused; shall be interpreted as "packet services via S1", if received by the network. |
| 1 | 0 | 1 | 1 | unused; shall be interpreted as "packet services via S1", if received by the network. |

All other values are reserved

Before proposing the solution, the problem scenario will be described as follows. The problem scenario is commonly applied to the embodiments proposed in the present specification.

<Problem Scenario>

1. When uplink data or uplink signaling(e.g., ESM signaling) is generated in a UE or a UE receives a paging message, the Service Request procedure is triggered. Accordingly, the Extended Service Request message or the Service Request message may be generated as an initial NAS message.

2. When a NAS layer of the UE receives an RRC connection resume indication from an AS layer of the UE (or when an RRC connection is resumed), the UE (NAS layer) regards it as accept/success response for the Extended Service Request message or the Service Request message, and establishes a user plane bearer (i.e., switching to an EMM Connected mode/state).

3. In the case that the generated initial NAS message is the Extended Service Request message, the UE (NAS layer) transmits the corresponding initial NAS message, and does not transmit the corresponding initial NAS message in the case that the generated initial NAS message is the Service Request message.

4. The UE (NAS layer) that establishes the user plane bearer by regarding the RRC connection resume indication as accept/success response for the service request performs a procedure for transmitting the uplink data or uplink signaling(e.g., ESM signaling).

5. The MME may respond with the Service Reject message to the initial NAS message transmitted by the UE (NAS layer). However, the MME does not respond with accept/success message to the corresponding initial NAS message, and an additional operation is not defined.

[Invention Proposal A]—Transmit the UL Data/UL Signaling after the UE NAS Layer Identifies/Determines that the Initial NAS Message is Accepted by the Network (MME or eNB)

As an embodiment, until the Service Request message or the Extended Service Request message is successfully forwarded to the network (MME or eNB) and the UE (NAS layer) identifies/determines that the request of the UE (NAS layer) through the corresponding message is accepted in the network (MME or eNB), the UE (NAS layer) may suspend the transmission of the uplink data or uplink signaling (generated in step 1 of the <Problem Scenario>). That is, after the UE (NAS layer) identifies/determines that the Service Request message or the Extended Service Request message is successfully forwarded to the network (MME or eNB) and the network (MME or eNB) accepts the corresponding message, the UE (NAS layer) may transmit the uplink data or uplink signaling(e.g., ESM signaling).

The method will be described in the detailed invention proposal below for the UE (NAS layer) to determine that the Service Request message or the Extended Service Request message is successfully forwarded to the network (MME or eNB) and the network (MME or eNB) accepts the corresponding message.

[Detailed Invention Proposal A-1]—Use a Supervision Timer

As an embodiment, a UE (NAS layer) may use a supervision timer for identifying/determining whether the message is succeeded or accepted. More particularly, the UE (NAS layer) may start the supervision timer when the Extended Service Request message or the Service Request message is transmitted, and in the case that there is no response from a network or a UE-AS (RRC layer) until the supervision timer is expired, the UE (NAS layer) may regard it as success/accept for the corresponding message. In addition, when receiving a Service Reject message (or response) while the supervision timer is ongoing/operating, the UE (NAS layer) may regard it as reject for the corresponding message.

The supervision timer may be newly defined for the resume procedure, or the timer (e.g., T3417 or T3417ext) defined previously may be reused for the supervision timer.

In the latter case, the previously defined timer (e.g., T3417 or T3417ext) is started by being set as an initial value in step 3 of the <Problem Scenario>. In this case, according to whether the timer (e.g., T3417 or T3417ext) is started in step 1 of the <Problem Scenario>, the detailed operation of the supervision timer in step 3 may be divided into two cases (1) and (2) below.

(1) The case that T3417 or T3417ext was started in step 1 of the <Problem Scenario>

In this case, when the UE NAS layer receives an indication that the RRC connection is resumed in step 2 of the <Problem Scenario>, the UE NAS layer may stop T3417 or T3417ext which is running. In addition, in step 3 of the <Problem Scenario>, the UE NAS layer set T3417 or T3417ext as an initial value again and starts it.

(2) In the case that T3417 or T3417ext was not started in step 1 of the <Problem Scenario>, the UE (NAS layer) may start T3417 or T3417ext as the supervision timer in step 3 of the <Problem Scenario>.

[Detailed Invention Proposal A-2]—a Network Transmits an Explicit Response Indicating that the Initial NAS Message is Accepted to the UE (NAS Layer).

As an embodiment, the network (eNB or MME) may transmit the explicit response (accept message) indicating whether the initial NAS message is accepted to directly the UE (NAS layer). Through this, the UE (NAS layer) may determine/identify whether the initial NAS message is accepted. The present embodiment may be implemented as two forms as below.

1. Transmit a NAS Message (e.g. Service Accept Message) Indicating Success/Accept As an embodiment, the MME may transmit the NAS (accept) message that explicitly represents an accept response to the Service Request message or the Extended Service Request message generated in step 3 to the UE (NAS layer) (in step 5). Accordingly, in this case, the UE (NAS layer) does not regard the RRC connection resume indication transmitted from the lower layer as an accept to the Service Request message or the Extended Service Request message, but may determine the acceptance by receiving an explicit NAS (accept) message directly from the MME. In this case, the transmitted corresponding NAS (accept) message may be a Service Accept message or a NAS message newly defined for the accept response transmission.

The time when step 5 of the <Problem Scenario> is performed may correspond to the time when the MME receives 'S1-AP UE Context Resume Request message' from the eNB. And/or, the time when step 5 of the <Problem Scenario> is performed may correspond to the time when the MME transmit an 'S1-AP UE Context Resume Response message' to the eNB as a successful response to an 'S1-AP UE Context Resume Request message'.

2. Transmit an RRC Message Indicating Success/Accept Based on an S1-AP Message

As an embodiment, the MME may transmit the S1AP message including the accept response to the Service Request message or the Extended Service Request message generated in step 3 to the eNB, and the eNB may indicate/transmit the corresponding accept response to the UE as an RRC message. Herein, the S1AP message may be the 'S1-AP UE Context Resume Response message' or an S1AP message which is newly defined for the accept response transmission of the MME. The 'S1-AP UE Context Resume Response message' is a successful response to the 'S1-AP UE Context Resume Request message', and may be transmitted to the eNB from the MME. In addition, the RRC message may be a legacy RRC message or an RRC message which is newly defined for the accept response transmission/indication of the MME.

Figure 15:
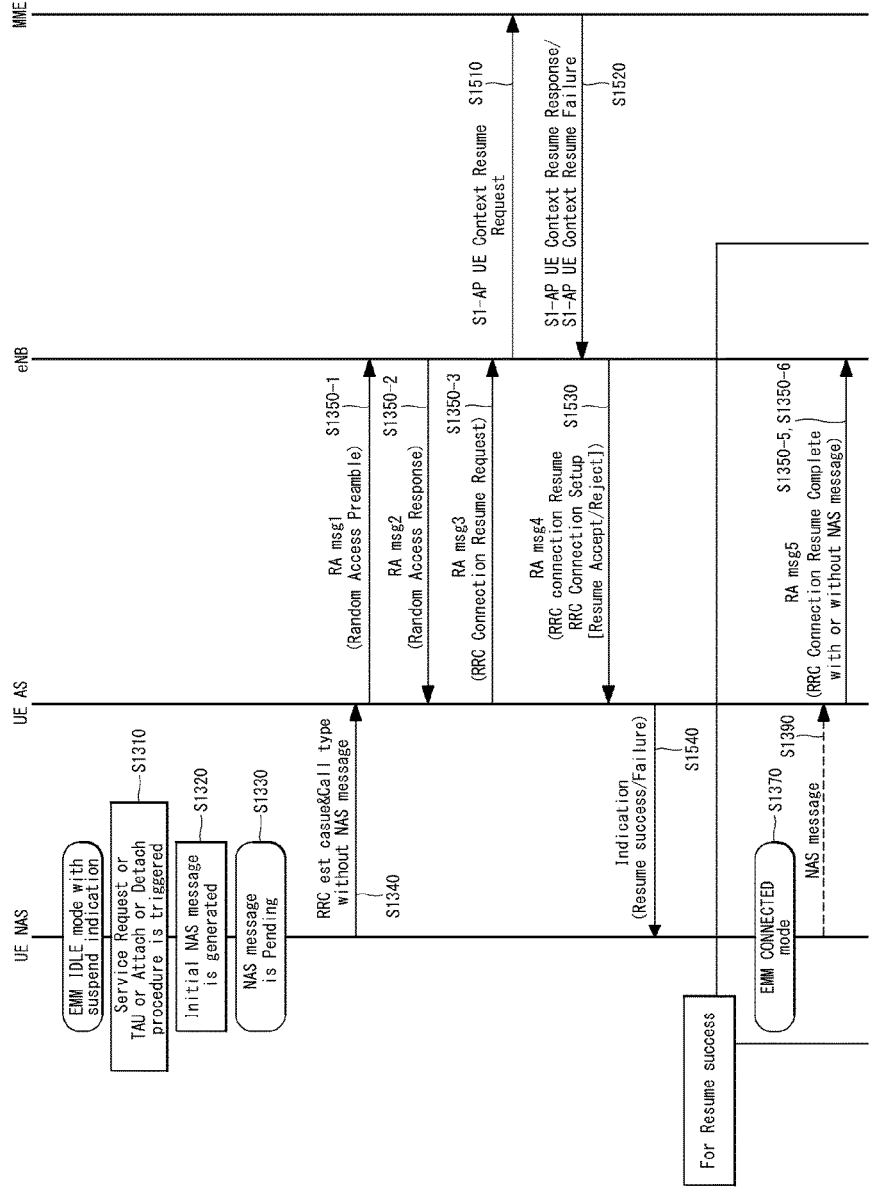
FIG. 15 is a flowchart illustrating a resume procedure according to an embodiment of the present invention.

The present embodiment may be implemented as an embodiment form of FIG. 15.

FIG. 15 is a flowchart illustrating a resume procedure according to an embodiment of the present invention. The description of the embodiment above may be identically applied to the present flowchart. Since the description of the remaining steps except steps S1510 to S1540 are already described with reference to FIG. 13, the overlapped description will be omitted below.

The eNB that receives the RRC connection resume request message in step S1350-3, may transmit the S1-AP UE context resume request message to the MME. The S1-AP UE context resume request message may perform the function of requesting an acceptance of resuming of the RRC connection of the UE (step, S1510). That is, the S1-AP UE context resume request message may perform the function of requesting the switch acceptance to the EMM-CONNECTED mode/state of the UE to the MME. This step can be performed on the assumption that the eNB has approved the RRC connection resume of the UE. If the eNB does not approve the RRC connection resume of the UE, a request to approve the RRC connection resume to the MME is unnecessary because the RRC connection resume is impossible.

Next, in response to the received S1-AP UE context resume request message, the MME may transmit the S1-AP UE context resume response message to the eNB when the MME accepts/approves the resume, and may transmit a S1-AP UE context resume failure message to the eNB when the MME does not accept/approve the resume (step, S1520). The MME may transmit the S1-AP UE context resume failure message to the eNB when the MME rejects the RRC connection resume request of the UE/eNB under a preconfigured specific condition (e.g., in the case that a bearer that may be newly established is not existed, etc.), or rejects an initial NAS message to be transmitted by the UE. In the case that the MME accepts the initial NAS message to be transmitted by the UE and the RRC connection resume request of the UE/eNB in such a case that the preconfigured specific condition is satisfied, and the like, the MME may transmit the S1-AP UE context resume response message to the eNB.

Subsequently, the eNB may transmit msg 4 (i.e., RA msg 4) with the indication information in relation to the resume accept/reject of the MME being included to the UE (lower layer). That is, when the eNB receives the S1-AP UE context resume failure message from the MME in step, S1520, the eNB may transmit msg 4 including the RRC connection setup message indicating that the RRC connection resume request is rejected to the UE (lower layer). Or, when the eNB receives the S1-AP UE context resume response message from the MME in step, S1520, the eNB may transmit msg 4 including the RRC connection resume message indicating that the RRC connection resume request is accepted to the UE (lower layer).

The UE lower layer (i.e., AS layer) that receives the RRC connection resume/RRC connection Setup message may transmit an indication representing whether the RRC connection resume is succeeded or failed to the UE NAS layer (step, S1540).

When receiving the resume success indication from the UE AS layer, the UE NAS layer may perform steps, S1370, S1390 and S1350-5/6 described above. When the UE NAS layer receives an indication indicating the success of the RRC connection resume from the UE AS layer, the UE NAS layer recognizes that the resume was successful and the MME has accepted the initial NAS message. Conversely, when the UE NAS layer receives an indication indicating a failure of the RRC connection resume from the UE AS layer, the UE NAS layer recognizes that the MME has rejected the RRC connection resume and/or the initial NAS message. At this time, in order to distinguish the rejection of the resume from the rejection of the initial NAS message, a cause indicating the reason for rejection may be included in the S1-AP UE Context Resume Failure message. This cause is included in the RRC connection setup message and is delivered to the UE AS layer, and the UE AS layer can forward the received cause to the UE NAS layer.

In the embodiments of FIGS. 9, 13 and 15, even in the case of receiving the acceptance from the eNB for the RRC connection resume, the procedure is progressed by regarding it as the accept is received from the MME. However, in this embodiment, since the RRC resume connection indication is transmitted after receiving the acceptance from the MME as well as the eNB, there is an effect that the problems that may occur when the resume or the initial NAS message is rejected from the MME later described above may be prevented.

[Invention Proposal B]—Transmit Only the Initial NAS Message Having the Response to Accept/Success As an embodiment, in the case of the initial NAS message (e.g., the Service request message and the Extended service request message (not for CSFB)) without a response to the success in step 5 of the <Problem Scenario>, a network may be configured not to respond to the corresponding initial NAS message, and a UE (NAS layer) may be configured not to not expect any response from the network. That is, it is defined such that a rejection response is not generated for the initial NAS message in which only the rejection response is existed without an accept response.

The detailed cases in which there is no response to the success in step 5 of the <Problem Scenario> are as follows.

1. The case that the Extended service request message is generated from other reason than the CSFB, and the RRC connection is resumed 2. The case that the Service request message is generated, and the RRC connection is resumed When an event like case 1 or case 2 occurs, it may be defined that the UE NAS layer does not transmit the corresponding NAS message, that is, the initial NAS message without a response to the success (e.g. the Extended service request message not for CSFB or the service request message) (conventionally, it is already defined not to transmit the service request message, but it is defined to transmit the Extended service request message). Accordingly, when the initial NAS message is not received from the UE, the MME may implicitly recognizes the situation of cases 1 and 2 described above, and this will be described in detail.

In addition, it may be defined that, when the MME recognizes case 1 or 2 occurs in the UE NAS layer, the MME does not transmit any response for cases 1 and 2. That is, it may be defined that, even in the case that a specific condition that the MME should reject for cases 1 and 2 is satisfied, the MME does not transmit the Service reject message. The UE/MME assumes that the MME accepts the request for cases 1 and 2 always, and it may mean that the MME is not expected to transmit the reject response.

In the case that the NAS message is sent on the time when the MME recognizes that the resume is succeeded, the MME may identify/determine that case 1 and/or 2 described above occur(s). Herein, the time when the MME determines that the resume is succeeded may be the time of receiving 'S1-AP UE Context Resume Request message' from the eNB.

The Invention Proposal B described above may be reflected on the User plane EPS optimization as follows.

In the UE, when User plane EPS optimization is used:
Upon indication from the lower layers that the RRC connection has been suspended, the UE shall enter EMM-IDLE mode with suspend indication, but shall not consider the NAS signaling connection released;
Upon trigger of a procedure using an initial NAS message when in EMM-IDLE mode with suspend indication, the UE shall request the lower layer to resume the RRC connection. In this request to the lower layer the NAS shall provide to the lower layer the RRC establishment cause and the call type according to annex D of this document;

Upon indication from the lower layers that the RRC connection has been resumed when in EMM-IDLE mode with suspend indication, the UE shall enter EMM-CONNECTED mode. If a SERVICE REQUEST message and EXTENDED SERVICE REQUEST message not for CSFB is pending, the message shall not be sent. If an initial NAS message different from SERVICE REQUEST message and EXTENDED SERVICE REQUEST message not for CSFB is pending, the message shall be sent; and (If a NAS message is discarded and not sent to the network, the uplink NAS COUNT value corresponding to that message is reused for the next uplink NAS message to be sent)

Upon indication from the lower layers that the RRC connection resume has been fallbacked when in EMM-IDLE mode with suspend indication, the UE shall enter EMM-IDLE mode without suspend indication, send any pending initial NAS message and proceed as if RRC connection establishment had been requested;

Upon indication from the lower layers that the RRC connection resume has failed and indication from the lower layers that the RRC connection is suspended, the UE shall enter EMM-IDLE mode with suspend indication and restart the ongoing NAS procedure if required; and Upon indication from the lower layers that the RRC connection resume has failed and indication from the lower layers that the RRC connection is not suspended, the UE shall enter EMM-IDLE mode without suspend indication and restart the ongoing NAS procedure if required.

In the network, when User plane EPS optimization is used:

Upon indication from the lower layers that the RRC connection has been suspended, the network shall enter EMM-IDLE mode with suspend indication, but shall not consider the NAS signaling connection released; and Upon indication from the lower layers that the RRC connection has been resumed when in EMM-IDLE mode with suspend indication, the network shall enter EMM-CONNECTED mode.

Upon indication from the lower layers that the RRC connection has been resumed, if the network does not receive any initial NAS message, the network shall not send any NAS reject message to the UE (i.e. the network shall accept the procedure using the initial NAS message).

Meanwhile, in the case that the initial NAS message generated in step 1 of the <Problem Scenario> is a Data Service Request message (or CONTROL PLANE SERVICE REQUEST message) in the control plane CIoT EPS optimization, the embodiments (Invention Proposal A and/or B) described above may be identically applied. Particularly, [Detailed Invention Proposal A-1] and [Invention Proposal B] may be applied, and the following message may be existed as success/accept response of a network in response to the Data Service Request message (or CONTROL PLANE SERVICE REQUEST message).

Security protected NAS message: this could be e.g. a SECURITY MODE COMMAND, SERVICE ACCEPT, and/or ESM DATA TRANSPORT message In the case that the success/accept response is not transmitted to the UE according to the legacy resume procedure, it may be configured that the MME transmits the SERVICE ACCEPT message separately to the UE. That is, when the MME is configured not to transmit the accept/success response in response to the DATA SERVICE REQUEST message to the UE in the case that the UE NAS layer performs the RRC connection resume procedure in the EMM-IDLE mode with suspend indication, the MME transmits the SERVICE ACCEPT message separately to the UE. An example of the case that the success/accept response is not transmitted to the UE includes the case that the UE lower (AS) layer transmit an AS indication indicating the RRC connection release or the Bearer establishment for user plane to the UE NAS layer (refer to FIG. 12).

FIG. 16 is a flowchart illustrating an RRC connection resume method of a UE according to an embodiment of the present invention. The embodiments described above may be identically or similarly applied to the present flowchart, and the overlapped description will be omitted.

First, as the RRC connection is suspended, a UE may enter the EMM-IDLE mode/state with suspend indication (step, S1610).

Next, when the procedure using the initial NAS message is triggered, the UE may generate the initial NAS message (step, S1620). In this case, the generated initial NAS message may have a first message type in which an accept response to be transmitted from the MME is existed or a second message type in which an accept response to be transmitted from the MME is not existed. The initial NAS message of the first message type may correspond to the TAU (Tracking Area Update) request message, the Attach request message, the Detach request message or the Extended Service Request message generated for CSFB (Circuit Switched Fallback) reason. The initial NAS message of the second message type may correspond to the Service request message or the Extended Service Request message generated not for CSFB reason. Here, the service type value of the Extended Service Request message generated not for CSFB reason may be configured as a value indicating 'packet services via S1'.

Next, the upper layer of the UE may request resume of the RRC connection to the lower layer (step, S1630). Here, the upper layer may correspond to the NAS layer, and the lower layer may correspond to the AS layer.

Next, when the upper layer of the UE receives an indication that the RRC connection is resumed from the lower layer, the upper layer may be switched from the EMM-IDLE mode with the suspended indication to the EMM-CONNECTED mode (step, S1640).

In the case that the initial NAS message generated in step, S1620 is the first type, the initial NAS message may be transmitted to the MME, and in the case that the initial NAS message generated in step, S1620 is the second type, the initial NAS message may not be transmitted to the MME. This is designed to prevent the occurrence of the post processing problem and so on that may occur as the rejection response is transmitted in response to the corresponding initial NAS message from the MME later, as described above. For this, it may be assumed that the procedure using the initial NAS message of the second message type may be accepted by the MME always.

In the case that the MME does not receive the initial NAS message within a preconfigured time from the time of recognizing that the RRC connection is resumed, the MME may recognizes that the procedure using the initial NAS message of the second message type is triggered, and may accept the procedure always. In this case, the time of recognizing that the RRC connection is resumed may correspond to the time of receiving the S1-AP UE Context Resume Request message including an EPS bearer list for which resume is requested from the eNB.

Meanwhile, although it is not shown in the flowchart, in the case that the initial NAS message of the second message type is the Service request message and the UE is switched to the EMM-CONNECTED mode, the step of transmitting uplink data or uplink signaling(e.g. ESM signaling message) may be included in the flowchart.

In addition, although it is not shown in the flowchart, when the upper layer of the UE receives an indication that the RRC connection resume is failed and the RRC connection is suspended from the lower layer, the UE(or the upper layer of the UE) may maintain the EMM-idle mode with a suspend indication. Alternatively, when the upper layer of the UE receives an indication that the RRC connection resume is failed and the RRC connection is not suspended from the lower layer, the UE(or the upper layer of the UE) may be switched from the EMM-IDLE mode with the suspend indication to the EMM-IDLE mode without the suspend indication. Alternatively, when the upper layer of the UE receives an indication that the RRC connection resume is fallbacked, the UE(or the upper layer of the UE) may be switched from the EMM-IDLE mode with the suspend indication to the EMM-IDLE mode without the suspend indication. Furthermore, the UE may transmit any pending initial NAS message(e.g. the generated initial NAS message in step S1620), and may proceed a procedure using the transmitted initial NAS message.

Device to which the Present Invention can be Applied

FIG. 17 is a block diagram illustrating a configuration of a communication device according to an exemplary embodiment of the present invention.

Referring to FIG. 17, a wireless communication system includes a network node 1710 and a plurality of UEs 1720.

The network node 1710 includes a processor 1711, a memory 1712, and a communication module 1713. The processor 1711 implements a function, a process and/or a method suggested in FIGS. 1 to 16. Layers of a wired/wireless interface protocol may be implemented by the processor 1711. The memory 1712 is connected to the processor 1711 to store various information for driving the processor 1711. The communication module 1713 is connected to the processor 1711 to transmit and/or receive a wired/wireless signal. The network node 1710 may be, for example, a base station, an MME, a HSS, a SGW, a PGW, a SCEF, a SCS/AS, and a Prose Function. Particularly, when the network node 1710 is a base station, the communication module 1713 may include a radio frequency (RF) unit for transmitting/receiving a wireless signal.

The terminal 1720 includes a processor 1721, a memory 1722, and a communication module (or RF unit) 1723. The processor 1721 implements a function, a process and/or a method suggested in FIGS. 1 to 16. Layers of a wireless interface protocol may be implemented by the processor 1721. The memory 1722 is connected to the processor 1721 to store various information for driving the processor 1721. The communication module 1723 is connected to the processor 1721 to transmit and/or receive a wireless signal.

The memories 1712 and 1722 may exist at the inside or the outside of the processors 1711 and 1721 and may be connected to the processors 1711 and 1721, respectively, by well-known various means. Further, the network node 1710 (a case of a base station) and/or the UE 1720 may have a single antenna or multiple antennas.

FIG. 18 is a block diagram illustrating a configuration of a communication device according to an exemplary embodiment of the present invention.

Particularly, FIG. 18 is a block diagram specifically illustrating the UE of FIG. 17.

Referring to FIG. 18, the UE may include a processor (or a digital signal processor (DSP)) 1810, a RF module (or RF unit) 1835, a power management module 1805, an antenna 1840, a battery 1855, a display 1815, a keypad 1820, a memory 1830, a Subscriber Identification Module (SIM) card 1825 (this element may be selected), a speaker 1845, and a microphone 1850. The UE may include a single antenna or multiple antennas.

The processor 1810 implements a function, a process and/or a method suggested in FIGS. 1 to 17. A layer of a wireless interface protocol may be implemented by the processor 1810.

The processor 1810 is connected to the processor 1810 and stores information related to operation of the processor 1810. The memory 1830 may exist at the inside or the outside of the processor 1810 and may be connected to the processor 1810 by well-known various means.

The user inputs, for example, instruction information such as a phone number by pressing (touching) a button of the keypad 1820 or by voice activation using the microphone 1850. The processor 1810 processes to perform an appropriate function such as reception of such instruction information and calling with a phone number. Operational data may be extracted from the SIM card 1825 or the memory 1830. Further, for user recognition and convenience, the processor 1810 may display instruction information or driving information on the display 1815.

The RF module 1835 is connected to the processor 1810 to transmit and/or receive an RF signal. In order to start communication, the processor 1810 transfers, for example, instruction information to the RF module 1835 in order to transmit a wireless signal constituting voice communication data. The RF module 1835 is configured with a receiver and a transmitter in order to receive and transmit a wireless signal. The antenna 1840 performs a function of transmitting and receiving a wireless signal. When receiving a wireless signal, the RF module 1835 may transfer a signal in order to process by the processor 1810 and may convert a signal with a base band. The processed signal may be converted to audible or readable information output through the speaker 1845.

In the foregoing exemplary embodiments, constituent elements and characteristics of the present invention are combined in a predetermined form. Unless phrases explicitly represent, it should be considered that each constituent element or characteristic is selective. Each constituent element or characteristic may be executed in a form that does not combined with other constituent elements or characteristics. Further, by combining some configurations and/or characteristics, an exemplary embodiment of the present invention may be configured. The order of operations described in exemplary embodiments of the present invention may be changed. Some configurations or characteristics of any exemplary embodiment may be included in another exemplary embodiment or may be replaced with a configuration or a characteristic corresponding to another exemplary embodiment. It will become apparent that claims that are not in an explicit cited relation in the claims may configure an exemplary embodiment by combination and may be included in new claim by amendment after filing.

An exemplary embodiment of the present invention may be implemented by various means, for example, hardware, firmware, software, or combinations thereof. When implementing by hardware, an exemplary embodiment of the present invention may be implemented by at least one application specific integrated circuits (ASICs), digital signal processors (DSPs), digital signal processing devices (DSPDs), programmable logic devices (PLDs), field programmable gate arrays (FPGAs), a processor, a controller, a microcontroller, and a microprocessor.

When implementing by firmware or software, an exemplary embodiment of the present invention may be implemented in a form of a module, procedure, and function that perform the foregoing function or operation. A software code may be stored at a memory to be driven by a processor. The memory may be located at the inside or the outside of the processor and may transmit and receive data to and from the processor by already known various means.

It will become apparent to a person of ordinary skill in the art that the present invention may be embodied in different specific forms without deviating from essential features of the present invention. Therefore, it should be considered that the detailed description is not to limit the present invention but to illustrate it. Thus, it is intended that the present invention cover the modifications and variations of this invention provided they come within the scope of the appended claims and their equivalents.

According to an embodiment of the present invention, an operation of UE/eNB/MME for a resuming procedure of a suspended RRC connection is clearly defined, and accordingly, there is an effect that uncertainty/ambiguity that may be existed in performing the corresponding procedure may be solved.

In addition, according to an embodiment of the present invention, a timer operation for a resuming procedure of a suspended RRC connection is clearly defined, and accordingly, there is an effect that uncertainty/ambiguity of the timer operation may be solved.

In addition, according to an embodiment of the present invention, there is an effect of resuming a suspended RRC connection quickly by omitting an unnecessary message transmission operation.

In addition, according to an embodiment of the present invention, there is an effect that the problem may be prevented, which may occur when a resume reject response is received from an MME after being switched to an EMM-CONNECTED mode by regarding an accept of the resume procedure.

The effect of the present invention is not limited to the above-described effects and the other objects will be understood by those skilled in the art from the following description.

An exemplary embodiment of the present invention mainly describes an example applied to a 3GPP LTE/LTE-A system, but can be applied to various wireless communication systems other than the 3GPP LTE/LTE-A system.

What is claimed is:

1. A method for resuming a radio resource control (RRC) connection performed by a user equipment (UE) in a wireless communication system, comprising:
    entering an Evolved Packet System (EPS) Mobility Management (EMM)-IDLE mode with a suspend indication as the RRC connection is suspended; generating an initial Non-Access Stratum (NAS) message when a procedure using the initial NAS message is triggered; requesting a resume of the RRC connection from an upper layer of the UE to a lower layer; and switching from the EMM-IDLE mode with the suspend indication to an EMM-CONNECTED mode when the upper layer receives an indication that the RRC connection is resumed from the lower layer, when the initial NAS message is a first message type in which an accept response to be transmitted from a Mobility Management Entity (MME) is existed, wherein the initial NAS message is transmitted to the MME, and when the initial NAS message is a second message type in which an accept response to be transmitted from the MME is not existed, wherein the initial NAS message is not transmitted to the MME.

2. The method for resuming the RRC connection of claim 1, wherein the procedure using the initial NAS message of the second message type is assumed to be accepted always by the MME.

3. The method for resuming the RRC connection of claim 1, wherein the MME recognizes that the procedure using the initial NAS message of the second message type is triggered when the MME does not receive the initial NAS message within a preconfigured time from a time of recognizing that the RRC connection is resumed, and is a network entity that accept the procedure always.

4. The method for resuming the RRC connection of claim 3, wherein the time of recognizing that the RRC connection is resumed by the MME corresponds to a time of receiving an S1-AP UE Context Resume Request message including an Evolved Packet System (EPS) bearer list for which the resume is requested from an evolved-NodeB (eNB).

5. The method for resuming the RRC connection of claim 4, wherein the initial NAS message of the first message type is a TAU (Tracking Area Update) request message, an Attach request message, a Detach request message or an Extended Service Request message generated for CSFB (Circuit Switched Fallback) reason, and
    wherein the initial NAS message of the second message type is a Service request message or an Extended Service Request message generated for non-CSFB reason.

6. The method for resuming the RRC connection of claim 5, wherein a service type value of the Extended Service Request message generated for the non-CSFB reason is configured to be a value indicating 'packet services via S1'.

7. The method for resuming the RRC connection of claim 5, further comprising transmitting uplink data or uplink signaling, when the initial NAS message of the second message type is the Service request message and the UE is switched to the EMM-CONNECTED mode.

8. The method for resuming the RRC connection of claim 5, further comprising maintaining the EMM-IDLE mode with the suspend indication, when the upper layer receives an indication that the RRC connection resume is failed and the RRC connection is suspended from the lower layer.

9. The method for resuming the RRC connection of claim 5, further comprising switching from the EMM-IDLE mode with the suspend indication to the EMM-IDLE mode without the suspend indication, when the upper layer receives an indication that the RRC connection resume is failed and the RRC connection is not suspended from the lower layer.

10. The method for resuming the RRC connection of claim 5, switching from the EMM-IDLE mode with the suspend indication to the EMM-IDLE mode without the suspend indication, transmitting the initial NAS message and proceeding the procedure using the initial NAS message, when upper layer receives an indication that the RRC connection resume is fallbacked.

11. A user equipment (UE) for resuming a radio resource control (RRC) connection in a wireless communication system, comprising: a communication module configured to transmit and receive a signal; and a processor configured to control the communication module, wherein the processor is configured to:

enter an Evolved Packet System (EPS) Mobility Management (EMM)-IDLE mode with a suspend indication as the RRC connection is suspended; generate an initial Non-Access Stratum (NAS) message when a procedure using the initial NAS message is triggered; request a resume of the RRC connection from an upper layer of the UE to a lower layer; and switch from the EMM-IDLE mode with the suspend indication to an EMM-CONNECTED mode when the upper layer receives an indication that the RRC connection is resumed from the lower layer, when the initial NAS message is a first message type in which an accept response to be transmitted from a Mobility Management Entity (MME) is existed, wherein the initial NAS message is transmitted to the MME, and when the initial NAS message is a second message type in which an accept response to be transmitted from the MME is not existed, wherein the initial NAS message is not transmitted to the MME.

12. The UE of claim 11, wherein the procedure using the initial NAS message of the second message type is assumed to be accepted always by the MME.

13. The UE of claim 12, wherein the MME recognizes that the procedure using the initial NAS message of the second message type is triggered when the MME does not receive the initial NAS message within a preconfigured time from a time of recognizing that the RRC connection is resumed and is a network entity that accept the procedure always.

14. The UE of claim 13, wherein the time of recognizing that the RRC connection is resumed by the MME corresponds to a time of receiving an S1-AP UE Context Resume Request message including an Evolved Packet System (EPS) bearer list for which the resume is requested from an evolved-NodeB (eNB).

15. The UE of claim 14, wherein the initial NAS message of the first message type is a TAU (Tracking Area Update) request message, an Attach request message, a Detach request message or an Extended Service Request message generated for CSFB (Circuit Switched Fallback) reason, and wherein the initial NAS message of the second message type is a Service request message or an Extended Service Request message generated for non-CSFB reason.

* * * * *